US008825982B2

(12) United States Patent
Kultursay et al.

(10) Patent No.: US 8,825,982 B2
(45) Date of Patent: Sep. 2, 2014

(54) STORAGE UNSHARING

(75) Inventors: Emre Kultursay, State College, PA (US); Kemal Ebcioglu, Katonah, NY (US); Mahmut Taylan Kandemir, State College, PA (US)

(73) Assignee: Global Supercomputing Corporation, Yorktown Heights, NY (US)

( * ) Notice: Subject to any disclaimer, the term of this patent is extended or adjusted under 35 U.S.C. 154(b) by 284 days.

(21) Appl. No.: 13/156,881

(22) Filed: Jun. 9, 2011

(65) Prior Publication Data

US 2011/0307663 A1 Dec. 15, 2011

Related U.S. Application Data

(60) Provisional application No. 61/353,248, filed on Jun. 10, 2010.

(51) Int. Cl.
G06F 13/28 (2006.01)
G06F 17/50 (2006.01)
G06F 12/08 (2006.01)

(52) U.S. Cl.
CPC ........ *G06F 17/5045* (2013.01); *G06F 2217/68* (2013.01); *G06F 12/0806* (2013.01)
USPC .......................................... 711/173; 711/125

(58) Field of Classification Search
USPC ........................ 717/131, 140, 149, 155, 168
See application file for complete search history.

(56) References Cited

U.S. PATENT DOCUMENTS

| 4,503,501 A | 3/1985 | Coulson et al. |
| 5,357,623 A | 10/1994 | Megory-Cohen |
| 5,481,736 A * | 1/1996 | Schwartz et al. ............. 712/23 |
| 5,553,023 A | 9/1996 | Lau et al. |
| 5,799,179 A | 8/1998 | Ebcioglu |
| 5,845,103 A * | 12/1998 | Sodani et al. ................. 712/216 |
| 5,913,224 A * | 6/1999 | MacDonald ................. 711/125 |
| 6,360,303 B1 | 3/2002 | Wisler et al. |
| 6,493,800 B1 | 12/2002 | Blumrich |
| 6,865,647 B2 | 3/2005 | Olarig et al. |
| 7,571,302 B1 * | 8/2009 | Chen et al. ..................... 712/217 |
| 7,620,945 B1 * | 11/2009 | Song et al. .................... 717/149 |
| 8,195,912 B2 * | 6/2012 | Flynn et al. ................... 711/202 |
| 2002/0116596 A1 * | 8/2002 | Sanches et al. ................. 712/24 |
| 2003/0014602 A1 * | 1/2003 | Shibayama et al. .......... 711/156 |
| 2004/0010782 A1 * | 1/2004 | Moritz ........................... 717/151 |
| 2004/0128452 A1 * | 7/2004 | Schmisseur et al. .......... 711/144 |
| 2004/0143707 A1 * | 7/2004 | Olarig et al. .................. 711/129 |
| 2004/0199792 A1 * | 10/2004 | Tan et al. ....................... 713/201 |

(Continued)

OTHER PUBLICATIONS

Barua, Lee, Amarasinghe, Agarwal, 1998. Maps: a Compiler-Managed Memory System for RAW Machines. Technical Report. UMI Order Number: TM-583., Massachusetts Institute of Technology, USA.

(Continued)

*Primary Examiner* — Charles Rones
*Assistant Examiner* — Han Doan

(57) ABSTRACT

A method is described to partition the memory of application-specific hardware compiled from a software program. Applying the invention generates multiple small memories that need not be kept coherent and are defined over a specific region of the program. The invention creates application specific hardware which preserves the memory image and addressing model of the original software program. The memories are dynamically initialized and flushed at the entries and exits of the program region they are defined in.

22 Claims, 8 Drawing Sheets

(56) References Cited

U.S. PATENT DOCUMENTS

| | | | | |
|---|---|---|---|---|
| 2005/0108499 | A1* | 5/2005 | Huang et al. | 711/217 |
| 2005/0216899 | A1* | 9/2005 | Muthukumar et al. | 717/151 |
| 2008/0046736 | A1* | 2/2008 | Arimilli et al. | 713/176 |
| 2008/0049536 | A1* | 2/2008 | Kajigaya | 365/230.05 |
| 2009/0210677 | A1* | 8/2009 | Luick | 712/220 |
| 2009/0235237 | A1* | 9/2009 | Song et al. | 717/132 |
| 2009/0293048 | A1* | 11/2009 | Chen et al. | 717/151 |
| 2010/0011339 | A1* | 1/2010 | Eichenberger et al. | 717/106 |
| 2010/0161904 | A1* | 6/2010 | Cypher et al. | 711/122 |
| 2010/0161948 | A1* | 6/2010 | Abdallah | 712/228 |
| 2010/0274972 | A1* | 10/2010 | Babayan et al. | 711/125 |
| 2010/0287550 | A1* | 11/2010 | Eichenberger et al. | 718/100 |
| 2010/0306753 | A1* | 12/2010 | Yi et al. | 717/149 |
| 2011/0022811 | A1* | 1/2011 | Kirihata et al. | 711/162 |
| 2011/0154122 | A1* | 6/2011 | Li et al. | 714/38.1 |
| 2011/0238962 | A1* | 9/2011 | Cain et al. | 712/228 |
| 2011/0276783 | A1* | 11/2011 | Golla et al. | 712/200 |
| 2012/0204189 | A1* | 8/2012 | Eichenberger et al. | 718/106 |

OTHER PUBLICATIONS

Babb, Rinard, Moritz, Lee, Frank, Barua, Amarasinghe, 1999. Parallelizing Applications into Silicon. In Proceedings of the Seventh Annual IEEE Symposium on Field-Programmable Custom Computing Machines (Apr. 21-23, 1999). FCCM. IEEE Computer Society, Washington, DC, 70.

G.A Scalzi, A.G. Ganek, R.J. Schmatz. Enterprise Systems Architecture/370: An architecture for multiple virtual space access and authorization. IBM Systems Journal, vol. 28. No. 1, 1989. pp. 15-38.

Kevin M. Lepak and Mikko H. Lipasti. 2000. Silent stores for free. In Proceedings of the 33rd annual ACM/IEEE international symposium on Microarchitecture (MICRO 33). ACM, New York, NY, USA, 22-31. DOI=10.1145/360128.360133 http://doi.acm.org/10.1145/360128.360133.

Mark D. Hill and Alan Jay Smith. 1984. Experimental evaluation of on-chip microprocessor cache memories. In Proceedings of the 11th annual international symposium on Computer architecture (ISCA '84). ACM, New York, NY, USA, 158-166. DOI=10.1145/800015.808178 http://doi.acnorg/10.1145/800015.808178.

Manoj Franklin. The Multiscalar Processor. PhD Thesis, 1993. Computer Sciences Department. University of Wisconsin-Madison. ftp://ftp.cs.wisc.edu/sohi/theses/franklin.pdf.

Weinhardt and Luk. Memory access optimization and ram inference for pipeline vectorization. In Field-Programmable Logic and Applications, Proceedings of the 9th International Workshop, FPL '99, Lecture Notes in Computer Science 1673, Springer-Verlag 1999, ISBN 3-540-66457-2, pp. 61-70.

Co-owned, co-pending U.S. Appl. No. 13/296,232, filed Nov. 11, 2015, Ebcioglu et al., Method and system for converting a single-threaded program into an application-specific supercomputer. Please see Optimization 1 starting on p. 110.

Co-owned, co-pending U.S. Appl. No. 13/366,318, filed Feb. 4, 2012, Ebcioglu et al., Parallel hardware hypervisor for virtualizing application-specific supercomputers.

* cited by examiner

STORAGE UNSHARING

FIELD OF THE INVENTION

The invention relates to partitioning memory for the purpose of improving the performance of application-specific hardware compiled from a software program.

BACKGROUND OF THE INVENTION

With the improvements in process technology and computer architecture, higher number of processing elements are being packed into a single chip in the form of more cores in a multicore, more LUTs in an FPGA, or more special purpose blocks in an ASIC. As a result of this increase in the computational capacity, coupled with highly parallel processing, the pressure on the memory system is also increased. However, memory system performance cannot scale as well as the processing elements and is becoming the major bottleneck in application-specific hardware performance as well as general-purpose computing system performance. As a result, there is a need for scalable memory systems that can provide lower access latency and higher bandwidth within a power budget, in order to catch up with the demands of increased parallelism.

There are various causes of the scalability problem of memories. First, larger memories suffer larger access latencies and are more power hungry, due to their larger wire capacitances. Second, having only one memory (or a small number of memories) limits the maximum bandwidth provided by the memory system and the achievable parallelism. Third, as the number of ports to a memory is increased, its access latencies and power consumption are also increased.

In the presence of multiple parallel memory accesses (as in the case of a large general-purpose multicore computer), these causes for non-scalability of memories can be addressed with the typical approach of having a single, unified main memory, as well as a number of cache memories between the memory and the hardware modules. These caches comprise only some entries of the memory, and therefore, are smaller. Their smaller size makes them faster and multiple caches can provide higher bandwidth than the memory. However, an entry in the memory can exist in multiple caches simultaneously and the contents of all copies of a memory location must be consistent. In other words, these caches must be kept coherent.

With existing technologies, coherence can be imposed by means of a coherence protocol that requires messages to be transferred between the caches. These messages are delivered on a network that connects all caches that need to be kept coherent. Some of the most frequently used cache coherence mechanisms are snoopy (FIG. 1) and directory-based (FIG. 2) cache coherence mechanisms [10].

In the snoopy cache coherence mechanism, a memory request (101) emanating from a load or store instruction executed within a hardware module is first searched for a hit in the cache directly connected to the requesting module (102). If this cache generates a miss, it notifies the other caches (103-106) over a coherence network (107). Other caches, continuously snooping on the interconnection network, detect this notification and try to serve the request. If all caches in the coherence group (108) indicate a miss, then the request is delivered to the next level of memory through a memory switch (109). This switch connects the caches with the input ports of the next level (110) in the memory hierarchy.

In the case of directory based coherence mechanism, a miss on a cache (201) is directed to a coherence network (202) to be delivered to the corresponding directory (203). A directory entry for a cache block contains the list of caches that cache block exists in. If the directory indicates that the block does not exist in any cache, a miss is generated. The miss is delivered from the directory to the next level memory (204) over a memory switch (205). If the cache block exists at some other cache, that cache forwards the block over the coherence network.

FIG. 1 and FIG. 2 show only two particular implementations of caches. These caches have only one input port per cache and have only one bank (they are one-way interleaved). In general, a cache can be shared by multiple hardware modules, each having its own port to the cache[1]. Furthermore, a cache can comprise multiple interleaved banks that can operate in parallel. A multi-bank interleaved cache shared by five modules (301) is depicted in FIG. 3. In this shared cache, ports (302) are connected to the banks (303) using a shared port-to-bank network (304). There is an internal memory switch (305) that transfers the bank misses to the external memory switch between the cache and the next level memory.

[1]If two ports of a memory can be proven not to be accessed simultaneously, then these two ports can be merged into a single port. However, this is an exceptional case, and therefore, this technique does not solve the scalability problem of memory systems.

Although using distributed memory modules improves system performance, it still does not entirely solve the scalability problem. Specifically, the memories need to be kept coherent by means of high connectivity coherence networks. Such networks are not scalable and increasing the number of input and output ports of these networks greatly increases the access latencies.

Barua et al. [1] proposed a compiler-managed memory system for a specific processor architecture that consists of multiple memory modules, called tiles, which can operate independently. In this work, the compiler is exposed to the whole memory system and decides on the actual layout of data in these tiles. After static analysis of the program, the compiler finds sets of objects that can be accessed independently and places them to different tiles. Using the same technique, Babb et al. [2] showed how application-specific integrated circuits with distributed memories can be compiled from a sequential program specification.

Both of these works aim to find a partitioning of a single, large memory into multiple, smaller memories. This partitioning is computed only once by analyzing the whole program and remains fixed throughout the whole program. However, programs consist of multiple scopes (e.g., procedures, loops, begin-end blocks) and different program scopes can have different optimum partitionings. For example, a single memory can be split into multiple smaller memories only during the execution of a program region (such as a loop iteration), where the multiple small memories allow parallel simultaneous access with lower power and better latency. The method in this invention can partition memory at different program scopes and construct a multi-level memory partitioning whose shape can change dynamically at run-time.

Furthermore, the compilers in the aforementioned work either generate a distributed software program or an application-specific hardware circuit, neither of which has a requirement for an address to be translated between the software domain and the hardware accelerator domain. An accelerator hardware circuit, on the other hand, requires coherence not only within the software and within the hardware domains, but also across the two domains. For the case of hardware accelerators compiled from a software code fragment, the final effect of the hardware accelerator on memory must be functionally 100% compatible with the software code fragment that the accelerator replaces. Therefore, the single address space view of software must be preserved while accessing the memories in hardware. The method in this invention preserves the original view of the program address space. All extracted memories in hardware are accessed without changing the corresponding addresses in software.

Other works in the literature targeting memory partitioning focused on logical partitioning and targeted general purpose computing systems. Coulson et al. [3] described partitioning of magnetic disk storage cache for efficient cache memory utilization under varying system demands. In [4], memory is partitioned into sections such that some sections that are not likely to be used in the near future can be turned off, in order to avoid unnecessary refreshing. Wisler et al. [5] presents partitioning of memory shared by multiple processors, so that each processor has exclusive access to an associated memory partition. A cache manager that dynamically partitions cache storage across processes using a modified steepest descent method according to the cache performance is given in [6]. Olarig et al. [7] presents dynamic adjustment of private cache sizes in a cache system by moving cache segments from one private cache to another. All of these works describe methods to either modify cache sizes or reserve memory sections for specific processes rather than modifying the actual underlying cache hierarchy. Blumrich [8] invented a method to dynamically partition a shared cache to obtain private caches when sharing is no longer required. Although this provides isolation between applications, these partitions are still a part of the same physical module and suffering the similar access latencies as the baseline shared cache. Moreover, these isolated caches are accessed with separate address spaces. Also, none of the above-mentioned techniques are based on compiler analysis.

Multiple memories, which are accessed with the original addresses of a sequential program as in our invention, are also related to the concept of multiple address spaces. There has been historical work on computer architectures with multiple address spaces, for overcoming address space size limitations, and for achieving enhanced security. The IBM Enterprise System Architecture/370 [14] is one such example. However, unlike these prior works, the method of the present invention automatically creates a new program using multiple address spaces starting from a sequential program running on a single address space, through compiler analysis. This second program using multiple address spaces can in turn be converted into a custom hardware accelerator functionally identical to the original sequential program. The multiple address spaces in the present invention help achieve enhanced parallelism, and improved memory coherence hardware, and have a hierarchical organization. These features were not present in earlier works on multiple address spaces.

The sub-block placement technique for reducing cache traffic [16] has introduced multiple valid bits in a cache block, similar to our third optimization (a technique which also adds multiple valid bits to a cache block, to be described in the preferred embodiment section). However, unlike prior work, the combination of dirty and valid bits in the caches described in the present invention 1-ensures that write misses never cause a block to be read from the next level cache and 2-simultaneously avoids the false sharing error.

The Address Resolution Buffer of the multiscalar architecture [17] checks if a second speculatively executed thread has loaded a memory location before a logically preceding first thread has stored into the same location. Our eleventh optimization (speculative separation of memories) also monitors overlapping accesses to one or more memories. However, the problem solved by the present invention is different: there is no first and second thread. The present invention checks at runtime if the speculative assumption that the address spaces were disjoint was correct or not, and does so for more than two address spaces and also for hierarchically organized address spaces.

Prior works in the literature on compilers have created methods for dependence analysis [12], which is used to determine if two load/store instructions can refer to the same location. Dependence analysis is not our invention, although dependence analysis is used as a component of our invention.

SUMMARY OF THE INVENTION

This invention comprises a method to partition the memory of application-specific hardware compiled from a software program, into multiple smaller memories that can operate independently, and in parallel.

Multiple smaller memories can provide improved performance compared to the baseline system with a single, unified memory and coherent caches. These caches can use snoopy (FIG. 1) or directory based (FIG. 2) coherence mechanisms and can have any number of input ports and banks (FIG. 3).

The invention comprises: (i) a method to group the memory instructions in a given program using dependence analysis, (ii) a method to partition the program memory into smaller memories that need not be kept coherent, (iii) a method to modify the memory instructions such that they access the extracted memories, and (iv) a method to initialize/flush contents of the smaller memories during execution.

The invention preserves the original view of the program address space and all small memories extracted by the invention are accessed by the same addressing.

Initially, the input program code is analyzed to obtain information that can be used for dependence analysis. Using this information, the dependences between all memory instructions are identified. The results of the dependence analysis are used to construct a dependence graph. The connected components of an undirected version of this graph are computed. This creates groups of memory instructions that contain dependent memory operations, but there are no dependences between groups. Using this fact, the memory is partitioned into independent memories, each group of memory instructions having its own memory. The extracted memory is accessed using the same addresses as the original memory, however, it contains only a part of the addresses in the original memory. The technique guarantees that there cannot be any writable byte address that is shared between any two distinct memories. Since these memories are independent, they need not be kept coherent.

The memories obtained by applying the invention are smaller than (i.e., contain fewer addresses than) the original memory. Moreover, they are shared by a smaller number of memory instructions, which reduces the average number ports per memory. Using smaller memories with a reduced number of ports results in smaller cache interconnection networks and smaller cache coherence hardware. This reduces the power consumption, the area requirement, and the access latency. Multiple independent memories that operate in parallel also result in an increase in the memory bandwidth.

The major benefits of the invention can be summarized as (i) reduced power consumption, (ii) increased memory bandwidth, (iii) reduced memory access latency, and (iv) reduced memory system area. As a result, the invention brings about a more scalable memory system.

DESCRIPTION OF THE PREFERRED EMBODIMENT

Figure 1:
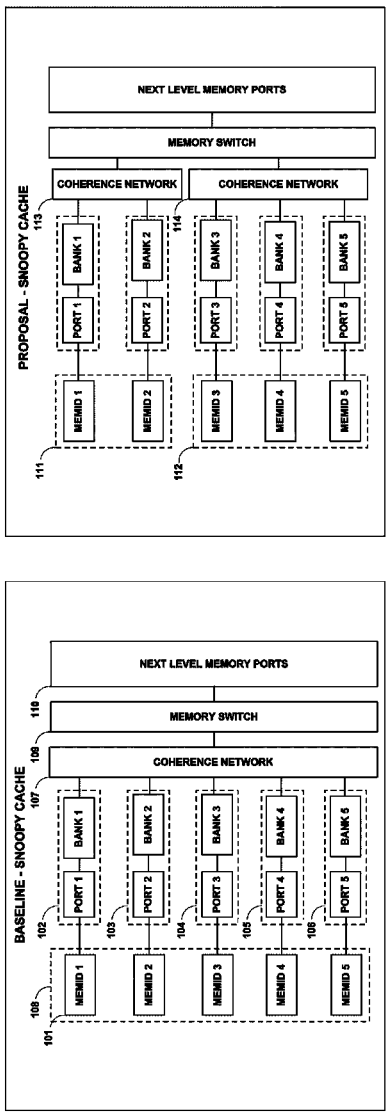
FIG. 1 schematically illustrates a snoopy cache before and after applying the invention.

The invention consists of four fundamental components: (i) dependence analysis across the memory instructions of a given program, (ii) construction of a partitioned memory using the connected components of the undirected dependence graph, (iii) modification of memory instructions such that they access the extracted memories instead of the original memory, and (iv) initializing and flushing the extracted memories at the entries and exits of the program.

As the first step of the invention, given a program, the compiler analyzes its memory instructions in order to collect information to be used in dependence analysis. This information is computed using a symbolic execution based data flow analysis in our preferred embodiment; though, it can be collected using any program analysis technique. The extracted information includes symbolic address expressions, value expressions, and path predicates. Then, the compiler performs dependence analysis (DA) over all pairs of memory (e.g. load or or store) instructions. In other words, using the collected information, for every pair of memory instructions, it decides whether a dependence exists between them. We further clarify dependence analysis below:

A program execution trace for a given input (initial memory contents) is the sequence of instructions executed by the program, when it is started with the given initial memory contents. In general, different initial memory states lead to different execution traces.

A dependence exists between two memory instructions $I_1$ and $I_2$ if there is some program execution trace where An instance of $I_1$ occurs first in the trace and an instance of $I_2$ occurs at some point thereafter, and These instances of $I_1$ and $I_2$ access the same memory address, and At least one of $I_1$, $I_2$ is a store.

DA can decide on one of the following three answers regarding a pair of instructions $I_1$ and $I_2$:

(i) yes, there exists an execution trace where $(I_1,I_2)$ are dependent, (ii) no, for all execution traces, $(I_1,I_2)$ are never dependent (iii) maybe, if neither (i) nor (ii) can be proved.

For example, considering the two memory instructions $I_1$ and $I_2$ in the following dependence analysis example program fragment, the compiler detects that the location read by $I_1$ at one given iteration i, is being written by $I_2$ at the next iteration i+1. As a result, it determines that there is at least one execution trace where an instance of $I_1$ is executed (e.g. reading array index 2 in iteration 0), and then an instance of $I_2$ is executed (writing array index 2 in iteration 1), and they refer to the same location (array index 2). Namely, DA returns the yes dependence answer for these two instructions (a write after read, or anti-dependence). However, there is no dependence between $I_2$ and $I_3$ since the index value 2i of $I_2$ can never be equal to index value 4i'−11 of $I_3$ for any integers i and i', since one expression is always odd and the other is always even. Therefore DA returns no for $(I_2,I_3)$. Such dependence questions can be answered more generally, for example by using the Greatest Common Divisor test [13], known in compiler dependence analysis. As another example, DA cannot provide either a yes or no answer to the question of whether $(I_2,I_4)$ are dependent, since the indirection array B in $I_4$ may in general contain arbitrary values, and therefore DA returns the maybe answer for $(I_2, I_4)$.

```
//dependence analysis example
    for i = 0 to N/2−1
I₁:     load t1 = MEM [ A[2*(i+1)] ]
        add t2 = t1 − 2
I₂:     store MEM [ A[2*i] ] = t2
        if( . . . )
I₃:         store MEM [ A[4*i−11]]=0;
I₄:     load t3=MEM [ A[B[i]] ];
    end
```

As the next step, a dependence graph is constructed using the results of the DA. The vertices of this undirected graph represent the memory (load or store) instructions in the input code. A dependence between any two memory instructions is represented with an edge between the vertices corresponding to these two memory instructions. For the purpose of determining whether two instructions must use the same memory, the dependence graph (which is normally a directed graph) is made undirected, i.e., whenever there is a dependence $(I_1,I_2)$, it is also assumed that there is a dependence $(I_2,I_1)$. Taking a conservative approach, both yes and maybe dependences result in dependence edges. This dependence graph represents all memory dependences across the memory instructions accessing the memory.

Figure 4:
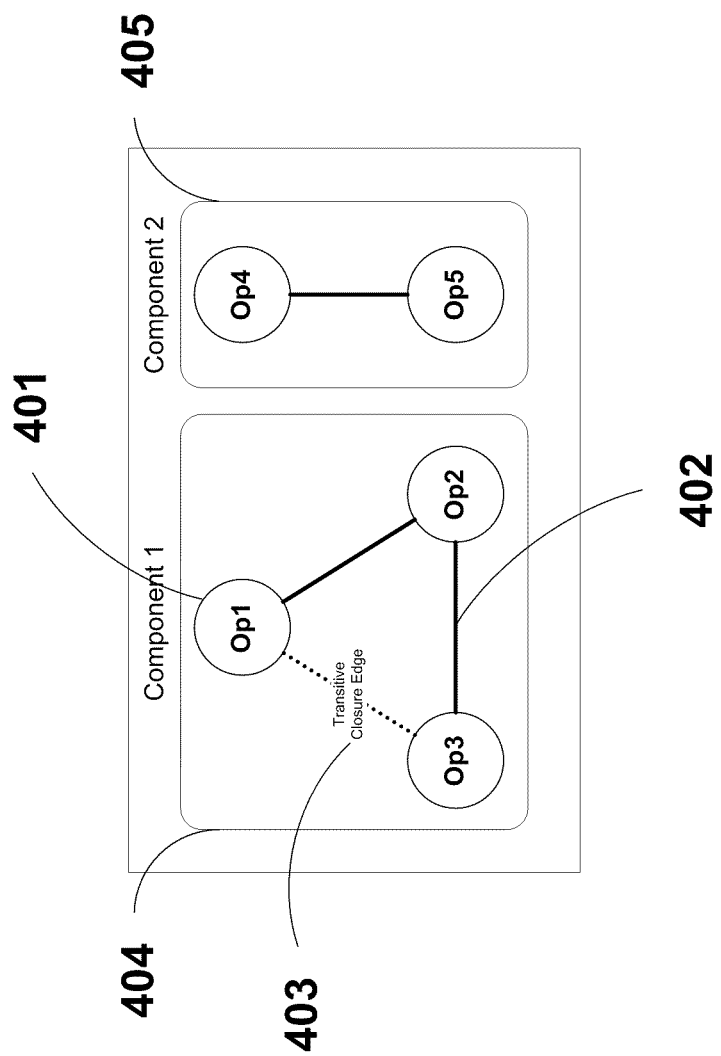
FIG. 4 schematically illustrates an undirected dependence graph and its connected components that are found using the transitive closure of dependence relation.

After representing the dependence information with an undirected dependence graph, the connected components of this graph are computed. A connected component is the minimal set of vertices that are directly or indirectly dependent to each other. As an example, the following program fragment, whose dependence graph is given in FIG. 4, has five memory instructions ($I_1$-$I_5$) that correspond to the five vertices (401) in the dependence graph. There are also three dependence edges (402) across the memory instructions $\{(I_1, I_2), (I_2, I_3), (I_4, I_5)\}$. 403 is an indirect dependence edge obtained from the transitive closure of the dependence relation, i.e., $(I_1, I_3)$ are not directly dependent, but end up in the same component/memory anyway. After performing connected components analysis, two connected components are obtained (404 and 405).

```
         r1 = cc1 ? &a : &b
         r2 = cc2 ? &b : &c
         r3 = cc3 ? &c : &d
I₁:      store MEM [ r1 ] = 1
I₂:      store MEM [ r2 ] = 2
I₃:      store MEM [ r3 ] = 3
         for i = L1 to U1
I₄:          store MEM [ A[i] ] = 4
         end
         for j = L2 to U2
I₅:          store MEM [ A[j] ] = 5
         end
```

The memory instructions in a connected component access only a part of the addresses in the input memory, namely only the addresses accessed by the loads/stores inside this connected component. Usage of dependence analysis to partition the memory ensures that the parts corresponding to distinct components are independent (i.e., no writable byte address is shared between the address spaces of two connected components). The memory is partitioned into smaller memories by assigning each connected component its own memory. The memories are enumerated from 1 to N, N being the number of connected components in the dependence graph. It should be noted that although these memories are independent, their read-only contents can still be overlapping. Addresses that are read-only (i.e. that are never stored into), do not impose any dependence. Therefore, multiple copies of such addresses can coexist in two distinct memories without violating coherence.

The next step of the invention is to perform modifications on the memory instructions. A memory instruction that belongs to the connected component i is modified to access the memory $MEM_i$ instead of the original memory MEM. This process defines a parent-child relationship between the memories, where MEM is the parent of $MEM_i$ for all i. As an example, consider the following code fragment with two memory operations where instruction $I_1$ belongs to component 1 and instruction $I_2$ belongs to component 2. Then, the original memory, i.e., MEM, is partitioned to obtain $MEM_1$ and $MEM_2$, and it becomes their parent memory. The two memory instructions are modified to reflect this change.

| Before | I₁: load r1 = MEM [ r2 ] |
|---|---|
|  | I₂: store MEM [ r3 ] = r4 |
| After | I₁: load r1 = MEM₁ [ r2 ] |
|  | I₂: store MEM₂ [ r3 ] = r4 |

It should be noted that a storage unsharing operation is defined and applied over a specific region of a program. At the entry of this program region, the child memories created using the proposed method must at runtime be activated and initialized from their parent memories. Similarly, at the exits of this program region, any changes to the contents of the child memories must be flushed to their parent memories and the child memories must be deactivated. The input program must be modified to include these operations. In order to achieve this, for each ($MEM_i$, $MEM_j$) parent-child pair defined over a program region R in the control flow graph of the program, the following modifications are performed:

"link $MEM_j$=$MEM_i$" instruction is placed on the entry edges of R in the control flow graph.
"unlink $MEM_i$=$MEM_j$" instruction is placed on the exit edges of R in the control flow graph.

A link operation activates a child memory and initializes the contents of the child memory from its parent memory at the entry edges of the region. I.e., the link operation copies the initial values of locations that will be read during the execution of the region, from the parent memory to the child memory. An unlink operation flushes (copies) the changed locations of a child memory back to its parent memory at the exit edges of the region and deactivates the child memory. Although link and unlink operations imply initialization and flush operations over memories, they do not necessarily require all contents of the child memory to be copied between the parent and child memories, as these memories are typically implemented as caches with dirty and valid bits. In this case, a link operation can simply be implemented as starting from a cache whose entries are all-invalid. An unlink operation is equivalent to writing back only the modified (dirty and valid) cache entries and invalidating all entries in the cache.

As a result of applying storage unsharing, the memory instructions that used to access a single, unified memory are modified to access the new child memories. Only a part of the address space is active in each child memory and the active parts of distinct memories are completely independent. This is achieved as a result of having no dependence edges across different connected components of the dependence graph. This independence enables these memories to be cached completely independently, with no need for a coherence protocol implemented across the caches.

Figure 2:
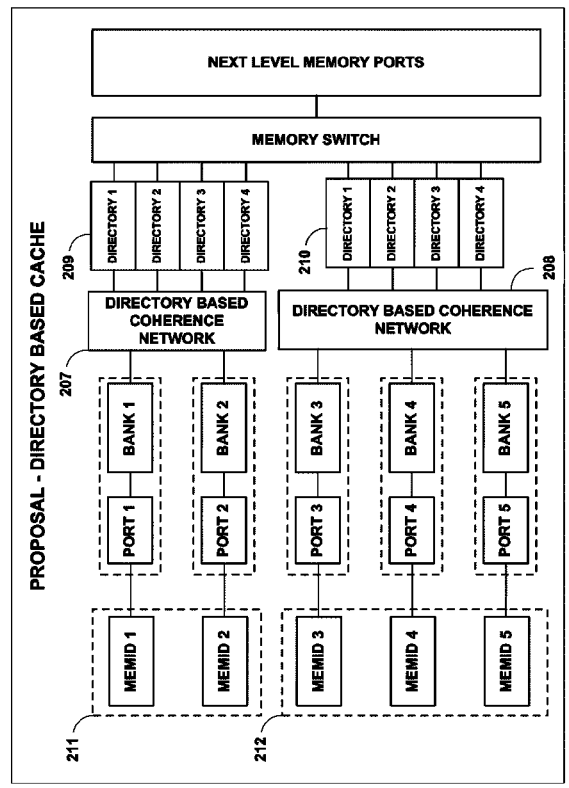
FIG. 2 schematically illustrates a directory-based cache before and after applying the invention.
Figure 2:
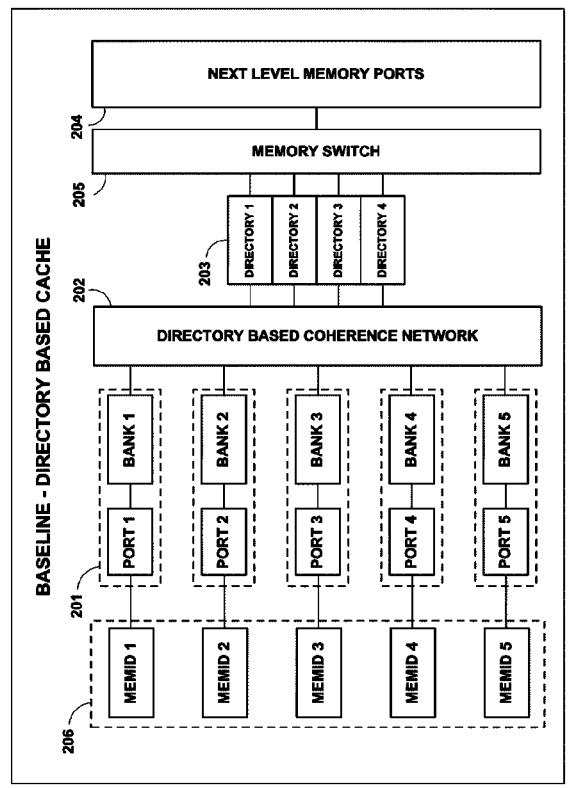
Figure 3:
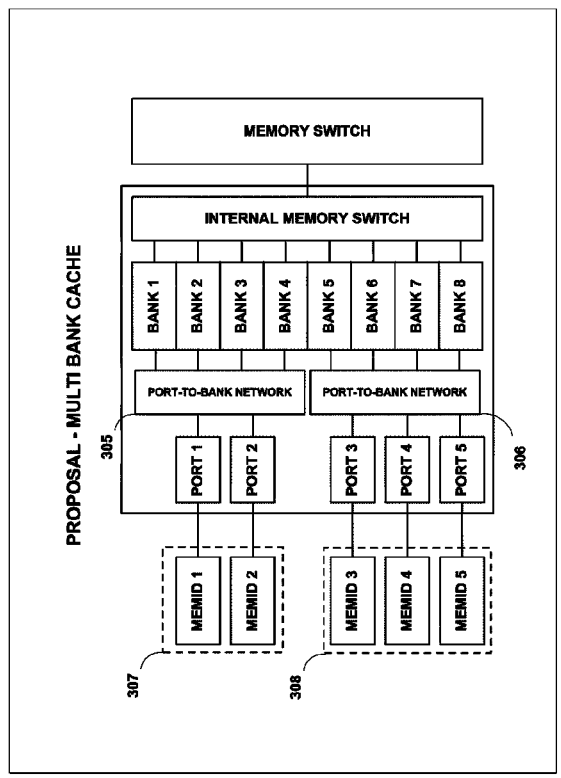
FIG. 3 schematically illustrates a multi-bank shared cache before and after applying the invention.
Figure 3:
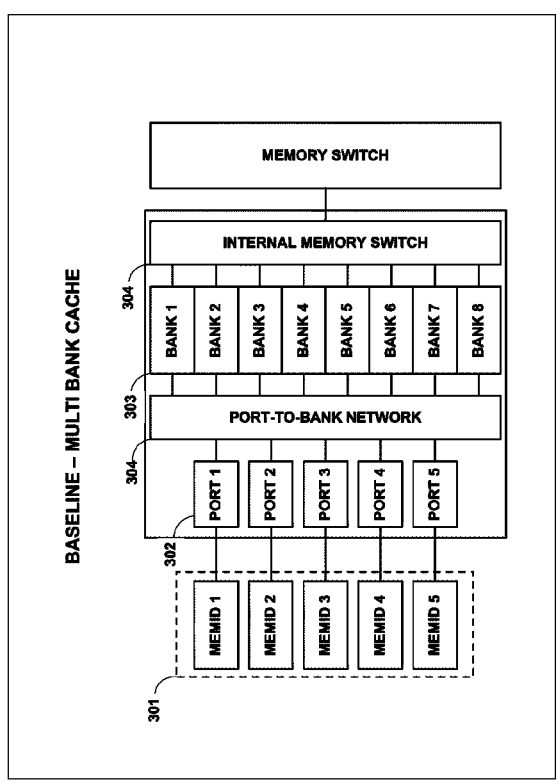

As an example, consider a program with five memory instructions. Caches with snoopy and directory based coherence mechanisms in the baseline are given on the left hand sides of FIGS. 1, 2. Application of the invention results in the caches shown on the right hand side of the same figures. In the case of snoopy caches (FIG. 1), the coherence domain (108) is partitioned into two independent coherence domains (111, 112) and instead of a single coherence network (107), two independent coherence networks (113, 114) are obtained. For the directory based caches (FIG. 2), a single directory-based coherence network (202) is replaced with two networks (207, 208), each one connected to a separate directory unit (209-210). The space required for the directory entries is not increased, because the new directory units typically have less number of bits per entry than the directory in the base case due to the reduced number of caches connected to a directory unit. Similarly, a single coherence domain (206) is separated into two coherence domains (211, 212). Considering a multi-bank, interleaved shared cache shown in FIG. 3, banks 1 through 4 are assigned to the first two memory instructions, and banks 5 through 8 are given to the last three memory instructions. As a result, the port-to-bank network in the base case (304) is separated into two independent networks (305-306). In all three cases (FIG. 1-3), a single cache in the base case is split into two parts that need not be kept coherent and can operate independently in parallel.

A Use of the Invention for Creating Application-Specific Hardware Accelerators

To put the invention further into context, we mention here one of the invention's possible uses. The invention can be used to create an application-specific hardware accelerator from a software program fragment, as follows: The base memory of the hardware accelerator is the software application's memory address space. When the original software program enters the code fragment that was turned into the hardware accelerator, it sends a message to the hardware accelerator. The hardware accelerator initializes its multiple memories from the software application address space using link operations (typically implemented as initialization of cache blocks in the accelerator, and additional messaging or Direct Memory Access (DMA) communication with the microprocessor running the software). It then performs the computation specified by the original software program fragment. During this computation the accelerator possibly alters its memories. The accelerator finally stores the any changes it made to its multiple memories back to the software application memory through unlink operations (typically implemented as flushing modified cache blocks of the accelerator, and additional messaging or DMA communication with the microprocessor running the software). Finally, the accelerator sends a message to the software program indicating it has completed its task. The software application then continues execution starting from the end of the original program fragment that was accelerated. The accelerator can take advantage of the fact that program fragments (such as loops) that operate on independent memories can be executed in parallel. In this manner, the original software program fragment will be seamlessly replaced by hardware accelerator execution, except that that the hardware accelerator takes advantage of increased parallelism, reduced memory access latencies, lower power and higher memory bandwidth, in comparison to the general purpose microprocessor system running the original software.

The application-specific accelerator can either be a custom, hard-wired design or a reconfigurable hardware design.

Optimizations

Apart from the four components (mentioned in the beginning of the preferred embodiment) that are fundamental for operation of the invention, various optimizations to improve its performance are applicable.

1—Recursive Application of Storage Unsharing

The first optimization is recursive application of storage unsharing over various program regions. Note that, as storage unsharing is defined over a program region, it can be applied multiple times over various program granularities such as a procedure, or a loop, or a begin-end block. Finer granularity unsharing can discover smaller connected components than coarser granularity unsharing, but it incurs the overheads of initializing and flushing address spaces more frequently. The preferred embodiment of the invention includes recursive application of storage unsharing from coarsest to finest granularity, to divide the set of memory instructions into groups. Storage unsharing is first applied at a whole procedure level, and then, inner scopes of the procedure are optimized. When storage unsharing is applied recursively, a multi-level memory hierarchy (e.g., including child memories of child memories) can be obtained instead of a single level of memory.

It should be noted that when storage unsharing is applied over a region of program, the variables that are invariant in that program region can be treated as constants, which enables further optimizations. For instance, when storage unsharing is applied over a region that is enclosed by a number of loops, the index variables of these enclosing loops can be considered to be constant. This results in a smaller set of locations to be accessed by the memory operations inside the loops, and finer granularity connected components. As a result, even smaller memories can be extracted.

The input program to storage unsharing can already contain multiple independent memories. This case naturally arises in the case of recursive storage unsharing as the results of earlier applications of the optimization are propagated to later applications. As all these input memories are already known to be independent, storage unsharing can be applied to these memories in any order, independently.

We provide following example to illustrate how storage unsharing is recursively applied:

```
//Original code:
1      int A[N,N];
2      int B[N,N];
```

```
3       int C[N];
4       for i = 0 to N-1
5         for(j1=0;tst(j1);j1=next(j1))
6 I₀:       load t1=MEM[B[i,j1]];
7 I₁:       load t2=MEM[C[rand( )%N]];
8           add t3=t1+t2;
9 I₂:       store MEM[A[i,j1]]=t3;
10        end
11        for j2 = 0 to N-1
12          if(i>=40)
13 I₃:         load t4=MEM[A[i-40,j2]];
14        end
15      end
16 I₄: store MEM[A[m,m]]=0;
//Transformed code:
    link MEM_A=MEM //A[*,*]
    link MEM_B=MEM //B[*,*]
    link MEM_C=MEM //C[*]
    int A[N,N]; //MEM_A
    int B[N,N]; //MEM_B
    int C[N]; //MEM_C
    for i = 0 to N-1
      link MEM_B1=MEM_B;//B[i,*]
      link MEM_A2=MEM_A;//A[i-40,*]
      link MEM_A1=MEM_A;//A[i,*]
      for(j1=0;tst(j1);j1=next(j1))
I₀:      load t1=MEM_B1[B[i,j1]];
I₁:      load t2=MEM_C[C[rand( )%N]];
         add t3=t1+t2;
I₂:      store MEM_A1[A[i,j1]]=t3;
      end
      for j2 = 0 to N-1
        if(i>=40)
I₃:        load t4=MEM_A2[A[i-40,j2]];
      end
      unlink MEM_A=MEM_A1;
      unlink MEM_A=MEM_A2;
      unlink MEM_B=MEM_B1;
    end
I₄: store MEM_A[A[m,m]]=0;
    unlink MEM=MEM_A
    unlink MEM=MEM_B
    unlink MEM=MEM_C
```

Analyzing the outermost region of the original code (the whole program in the example, lines 1-16) leads, through straightforward analysis (since A, B, C are different), to the three separate children memories of the overall root memory MEM. Namely: MEM_A=A[*,*] (accessed by $I_2,I_3,I_4$), MEM_B=B[*,*] (accessed by $I_0$) and MEM_C=C[*] (accessed by $I_1$). The outermost program represents execution traces from the very beginning of the program to the very end, and includes all iterations of the i loop. Upon entry to region corresponding to a single iteration of the i loop within the outermost region (lines 5-14 in the original program), dependence analysis, connected component creation and load/store instruction modification is applied to the i loop body only, for each of parent memories MEM_A, MEM_B and MEM_C. In the body of the i loop (lines 5-14), because i has become a constant, the results of the analysis are different than the outermost region (lines 1-16) where i is not a constant. A parent memory that is accessed within the loop body of the i loop can:

a) Give rise to more than one child memory (MEM_A=A [*,*] has children MEM_A1=A[i,*] and MEM_A2=A [i-40,*]). Instructions $I_2$ and $I_3$ in the example, do overlap during iteration pairs (0 and 40),(1 and 41), . . . of loop i in the outermost region (lines 1-16 of the original program), but do not overlap within a single iteration of loop i (lines 5-14 of the original program), where i is fixed. Hence, within a fixed iteration of loop i, $I_2$ and $I_3$ can access different independent memories MEM_A1 (A[i,*]) and MEM_A2 (A[i-40, *]), whose changed parts must be flushed back to the parent memory MEM_A at the end of the iteration i. Notice that the j1 and j2 loops can run as parallel threads using independent smaller memories within an iteration of the I loop, which is beneficial especially if there is sufficient reuse of the MEM_A1 and MEM_A2 memories.

b) Give rise to just one child memory (MEM_B (B[*,*]) has one child MEM_B1 (B[i,*])), which is smaller than (contains less addresses than) its parent, again due to the fact that the loop index i is constant during the loop body. This is exemplified by instruction $I_0$ accessing only a single row of its parent memory (the B matrix) during a fixed iteration i. Hence during a fixed iteration i (lines 5-14), the B matrix memory gives rise to its child, containing only one row of the B matrix. This is also beneficial in particular when the MEM_B1 row is sufficiently reused, since for example, a simpler cache with fewer address bits can be built for this child memory, since part of the address (determined by i) is now constant.

c) Give rise to no child memories (MEM_C=C[*] has no children in loop i). This can occur when the addresses of the memory operations referring to the parent memory within the region are independent of the loop index i, or any other variable repeatedly set in the same i loop (an induction variable of this loop). This is exemplified by instruction $I_1$, accessing C. The randomly generated index (rand( ) % N) of C is completely independent of the loop index i, hence the C memory remains unaffected when the i loop is entered. If a given memory is unaffected by one loop, it may still produce children as further inner loops of the present loop are seen (as it will be seen in the matrix multiply-add example in FIG. 7, later in this document).

In Appendix A of the present preferred embodiment, we provide an algorithm in pseudo C++ code, to implement recursive storage unsharing on an arbitrary procedure.

2—Solution to False Sharing Error Due to Large Cache Blocks

The second optimization on storage unsharing is the use of large cache block sizes to exploit spatial locality. Caches typically increase memory performance by making use of not only temporal, but also spatial locality. Spatial locality is based on the following assumption: if an address is referenced, nearby addresses are likely to be soon referenced as well. In order for a cache to make use of spatial locality, the block size of the cache needs to be larger than one data element. However, using larger blocks brings about a false sharing error. With a large block size, a false sharing error will occur if one child cache changes one part of a cache block and flushes the block to its parent, and a second child cache (independent from the first) of the same parent alters a different part of the same cache block, and also flushes the block to its parent, incorrectly overwriting the bytes written by the first cache with clean data. Without any method to eliminate the false sharing errors, the invention only works for cache block sizes of one data element. The technique employed by the invention to eliminate the false sharing error is through the use of dirty bits. In this case, one bit for every cache data byte indicates whether the byte has been written since it was brought into the cache. If there have been no writes to a byte, then the byte is not written back to the next level cache (or memory), but is discarded. Using this technique, the clean bytes of the cache block that are the reason for the false sharing error are discarded.

In general, dirty bits may need to be maintained by caches in all levels of the memory hierarchy until (but not including) the root memory (the original software application address space).

3—Avoiding Unnecessary Reads from Next Level Cache

The third optimization is to reduce the traffic between a cache and the next level by eliminating some cache reads from the next level. Typically, caches also contain a valid bit per cache block that indicates whether that cache block contains valid data. This approach can be modified to use one valid bit per data byte in the cache to optimize cache write performance. In this technique, when a cache write miss occurs, after flushing one cache block to vacate space, the missed cache block data need not be brought in from the next level, but can be initialized as all invalid. Then, after writing the data, only the newly written data bytes become valid and the rest of the block remains marked as invalid. This technique reduces the data traffic by not fetching the cache block from the next level. Note that, this optimization is not against the spatial locality of write requests due to the fact that, as long as there is space reserved for the accessed cache block, writes always become cache hits, independent of whether the bytes to be written to are valid or invalid.

Using one dirty bit and one valid bit for each cache data byte and applying the above optimization, the following cache coherency protocol can be used.

On a write hit (i.e., when the block to be written to is found in the cache), data is written to the target bytes of the cache block. The written bytes become dirty and valid. When a write miss occurs, an empty cache block, obtained by a write back operation if necessary, is allocated. The missed block is not read from the next level, but instead, the allocated block is initialized as all invalid. The data to write is written to the cache block and only the written bytes are marked as dirty and valid.

Cache reads are classified into three groups: (i) block hit, byte hit, (ii) block hit, byte miss, and (iii) block miss. A block hit occurs when cache tag comparison is successful. If the requested byte is valid, a byte hit occurs and the data is read from the cache line. However, if the requested byte is invalid, a byte miss occurs and the whole cache block is fetched from the next level and merged with the cache block in this level. During this merge operation, the non-dirty (i.e., either clean or invalid) bytes of this level are initialized with the contents of the next level cache. A block miss, on the other hand, occurs when tag comparison is unsuccessful. In this case, the cache block is brought from the next level and all bytes are marked as valid and not dirty.

When a cache block will be written back to the next level, only the dirty bytes are written to the next level and the clean or invalid bytes are discarded to prevent false sharing.

The following code fragment illustrates how the false sharing error can be eliminated using dirty bits. It contains two loops that write to the even and odd bytes of an array of bytes, respectively.

```
byte A[64]// 64 byte aligned
    for i = 0 to 31
I₁:     store MEM [ A[2i] ]   = 0
    end
    for j = 0 to 31
I₂:     store MEM [ A[2j+1] ] = 1
    end
```

Figure 5:
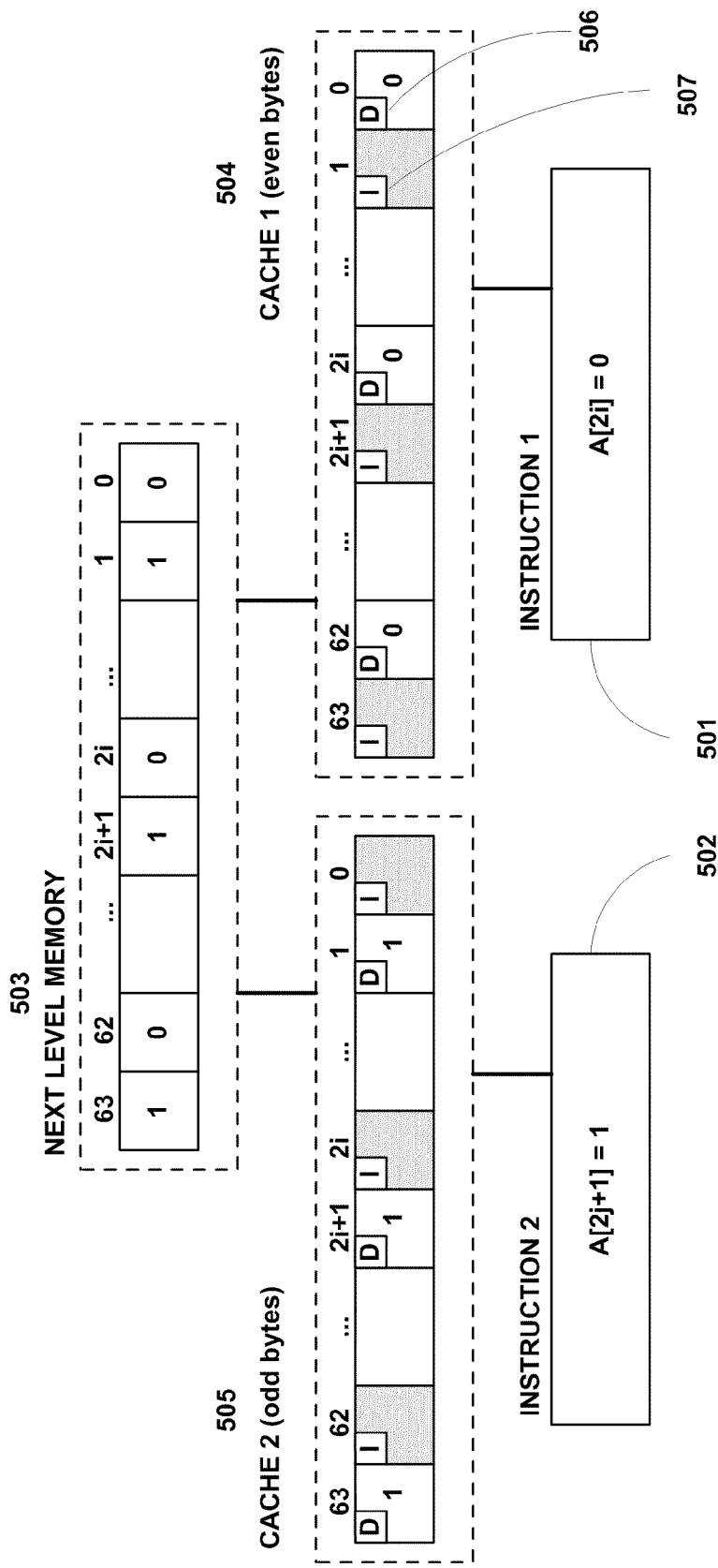
FIG. 5 schematically illustrates how dirty bits can be used to prevent false sharing in cache blocks that contain more than one data element.

When storage unsharing is applied to this code fragment, the two memory instructions in these two loops are detected to be independent and are placed in different connected components. As a result, they are assigned separate memories (caches) that need not be kept coherent. Assume that a data layout changing optimization (like optimization seven) is not done for this program, and hence we are stuck with the existing memory layout. Two caches with line size of 64 bytes are depicted in FIG. 5. As shown in this figure, when the two memory instructions (501-502) write the data into their caches, only the even bytes of the first cache (504) and the odd bytes of the second cache (505) are written and marked as dirty (506). The rest of the bytes remain as either invalid (507) if they are never initialized, or remain clean if they are initialized. When these caches are un-linked (flushed) to the next level of memory (503), only the dirty bytes are written. The dirty bytes in these two cache blocks can be merged with the data at the next level by discarding the invalid and clean bytes of these blocks. Using this approach, the zeros written by the first instruction are successfully merged with the ones written by the second instruction. As a result, the false sharing error, which would result in incorrect execution, is eliminated.

4—Reducing Storage Area Due to Dirty Bits

The fourth optimization is related to the storage space reserved for dirty bits in caches. The simple implementation of caches with dirty and valid bits requires two bits per each data byte in the cache. This introduces storage overhead in the caches. However, in some cases, this overhead can be eliminated or reduced. Specifically, if dependence analysis can prove that a cache will not be involved in any false sharing, then it can eliminate the dirty bits entirely. For example, a read-only cache does not require dirty bits. Moreover, if dependence analysis can uncover the granularity of false sharing between two caches, then it can reduce the overheads of dirty bits by reserving one dirty bit for a chunk of data larger than one byte. For instance, the two memory instructions $I_1$ and $I_2$ in the following program fragment write the first 32 bytes and the second 32 bytes of an array of bytes, respectively.

```
         byte A[64];//64 byte aligned
         for i = 0 to 31
I₁:         store MEM [ A[i] ] = 0
         end
         for j = 32 to 63
I₂:         store MEM [ A[j] ] = 1
         end
```

Since there is no dependence between these two memory instructions, they can be placed in different memories. But using caches with 64 byte lines introduces false sharing. In this case, stores occur only in aligned blocks of 32 bytes. There is no need for one dirty bit per byte. One dirty bit per 32 bytes is sufficient to eliminate false sharing.

In order to eliminate the dirty bits in a cache, dependence analysis can be modified to examine dependences not in a byte granularity, but in a coarser granularity such as the cache block size. In order to reduce the number of dirty bits in a cache, dependence analysis can be further modified to examine data dependences at different cache block sizes and find the largest cache block size that false sharing does not occur.

One example algorithm, a recursive algorithm that determines the maximum spacing between dirty bits in a cache block, is given below using a pseudo C++ code specification:

```
int dirtyBitSpacing(Memid m) {
   int n=infinite;
   foreach single store instruction
      or child memory x inside memory m {
      if x is a single store
         directly connected to m
         n=min(n,operand_size(x));
      else //if x is a child cache of m
         n=min(n,dirtyBitSpacing(x));
   }
   return n;
}
```

To detect if the operand size of a store is effectively larger than one byte, the following method can be used: If for a given collection of store instructions belonging to a particular memory in a given execution trace, there exists a power of 2 integer n such that for every store to an address 0 mod n, there always are other stores in the same collection to the addresses 1 mod n, 2 mod n, . . . , n−1 mod n, then the effective store operand size of each store in the collection is n bytes, not one byte. The example above had such a property with n=32. The same idea can be generalized to 2 byte, 4 byte, 8 byte, . . . stores.

If a parent cache has a more narrow dirty bit spacing compared to a child, then the child cache must replicate its dirty bits as it is flushing a block to its parent, to be able to match the dirty bit spacing the parent cache expects.

The spacing between valid bits can be increased in a similar way.

5—Using Standard RAMs and Registers Instead of Caches

Figure 8:
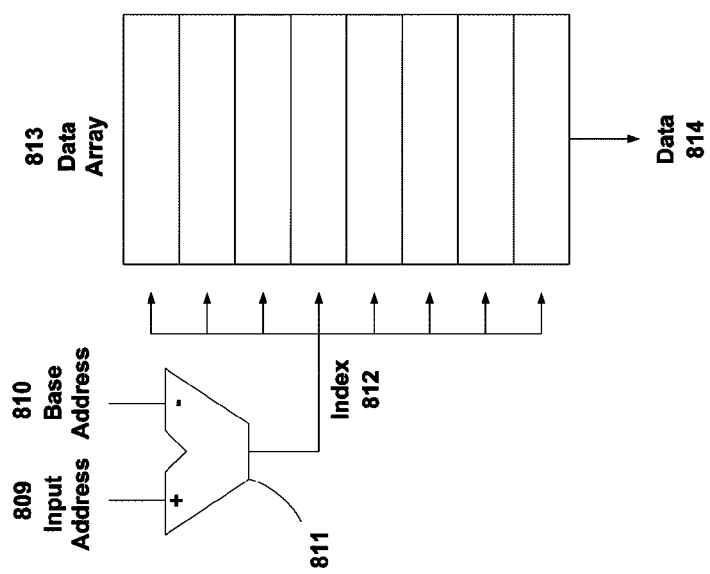
FIG. 8 schematically illustrates the structures of a tagged cache memory and a tagless memory.
Figure 8:
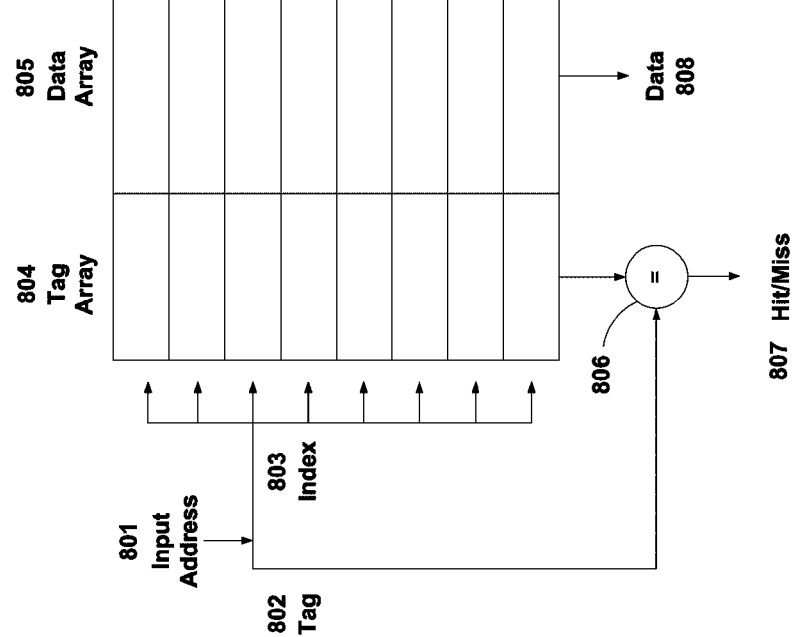

As a fifth optimization, if the set of locations accessed in a child memory can be represented as a base address plus some offset, and the maximum offset value can be determined at compile time, then this memory can be implemented using a special type of memory. An example is a connected component that consists of memory instructions that access a single contiguous storage area of at most N elements (like a simple array, or a matrix row or column). In this case, a memory of size equal to N elements to house this array entirely is created. This memory is internally addressed using only the offset in the array, which requires the base address of this memory to be subtracted from the addresses of all accesses to the memory. A direct mapped version of this tagless memory structure is compared to the standard direct-mapped tagged cache in FIG. 8. In the standard tagged cache memory, the input address (801) is decomposed into two parts: tag (802) and index (803). The index used to access only a particular element of the tag array (804) and the data array (805). The tag at that location in the tag array is compared (806) with the tag of the address to generate a hit or a miss (807). If there is a hit, then the data (808) is valid and can be used. On the other hand, in the tagless memory, a base address (810) is subtracted (811) from the the input address (809) to obtain the offset. This offset is used as an index (812) to the data array (813). The data (814) at the indexed location is valid and ready to be used. There are a number of advantages of this special type of memory over the standard cache structure. First, this memory structure never suffers from any capacity misses as it has one location reserved for each element in the target subspace. Second, since all locations in this memory are accessed using the same base address (810), there is no need for a tag array (804), which eliminates the need for a tag comparison (806). Finally, if the size of the target subspace is small, this memory can be implemented using a faster memory type such as SRAM, which translates into increased performance.

Barring optimizations, like all other memories, the special tagless memory must be initialized from its parent during a link operation and changes to it must be flushed to its parent memory (by using dirty bits), during an unlink operation.

Here is an important special case that allows a child memory to be instantiated as a register. When all the memory instructions connected to a child memory activated in a given loop iteration have a common address, and that address is dependent only on the induction variable of the present loop (not on the induction variable of any inner loop), then there must be only one data element that will be accessed in this entire child memory address space (since the loop index is fixed during the lifetime of the child memory). In this case, we can perform the following transformation starting from the result of storage unsharing, which amounts to register promotion:

```
//Original code
link MEMc=MEMp
...
load rData1=MEMc[rAddr]
...
if (cc) store MEMc[rAddr]=rData2
...
unlink MEMp=MEMc
              =>
//transformed code
//first rAddr is computed
load MEMc_data=MEMp[rAddr]
...
copy rData1 = MEMc_data
...
if (cc) copy MEMc_data=rData2;
...
store MEMp[rAddr]=MEMc_data
```

The net transformation is: a link MEMc=MEMp operation of a child memory MEMc, after the home location rAddr of MEMc in parent MEMp is computed (which must be fixed during the lifetime of the child memory), becomes a register load from the home location in parent memory MEMp to the special data register MEMc_data corresponding to this child memory. A unlink MEMp=MEMc operation on the child memory, becomes a store of the MEMc_data register to the same fixed home location in the parent memory. Loads/stores on the MEMc memory itself become register copy operations from or to MEMc_data. Then the copy operation can be eliminated by standard compiler copy elimination/coalescing techniques. Register promotion can provide an important performance enhancement. Since memory MEMc disappeared during the transformation (it became the register MEMc_data), we do not need to worry about dirty bits in MEMc. The parent cache MEMp may need dirty bits, as in any memory.

Here is another important special case related to vector register promotion. When it can be shown that the entire child memory address space is one N element contiguous area accessed as an indivisible block, whose starting address within the parent memory is fixed during the lifetime of the child memory, then the same idea can be applied to register promotion of N element vector (or matrix, or n-dimensional array) registers. The transformation sequence will be the same: link MEMc=MEMp loads the N-element vector register from its home location in MEMp (the home location is fixed during the lifetime of MEMc). unlink MEMp=MEMc stores the N-element vector register in its home location in MEMp. An N-element vector load inner loop or vector store inner loop becomes an N-element vector register copy, which in turn can be eliminated like a normal register copy. Again MEMc has disappeared and we do not need to worry about the dirty bits of MEMc (storing MEMc_data into MEMp is equivalent to storing N scalar registers into MEMp). MEMp, on the other hand, may still require dirty bits.

6—Avoiding Unnecessary Memory Initialization and Flushing

The sixth optimization relates to reducing or removing the overhead of initializing and flushing of memories. When a program region is exited, the memories that are defined over that program region become inactive and their contents must be un-linked from their parent memories. This flush operation requires the modified contents of the memory to be written to the parent. If a memory can be proven at compile time to be read-only or to be dead outside the current region (like a stack data structure whose lifetime ends when its lexical scope is exited), its contents may be discarded. Similarly, when a program region is entered, the memories that are defined on that region become active and they need to be initialized from their parent memories. However, a memory whose contents can be proven by the compiler to be either write-only or write-before-read need not be initialized. This implies that the initial contents of the cache corresponding to this memory are not important as long as all bytes are marked as invalid. When a memory need not be flushed at the exit edges from its region or need not be initialized at the entry edges to its region, then the link/unlink instructions added by the compiler are modified to link/unlink from/to the NULL memory instead of the parent memory.

link $MEM_i$=NULL means: activate $MEM_i$ and initialize it to undefined values.

unlink NULL=$MEM_i$ means: just deactivate $MEM_i$.

In a use of the invention where the software application contains the root memory, being able to initialize a memory from NULL and flushing a memory to NULL is important for being able to reduce communication between the software application running on a microprocessor and the hardware accelerator. Initializing a memory to NULL may prevent unneeded data from being sent from the software to the hardware accelerator. Flushing a memory to NULL prevents sending unneeded data back from the hardware to the software application.

7—Compacting a Child Memory Address Space

Figure 6:
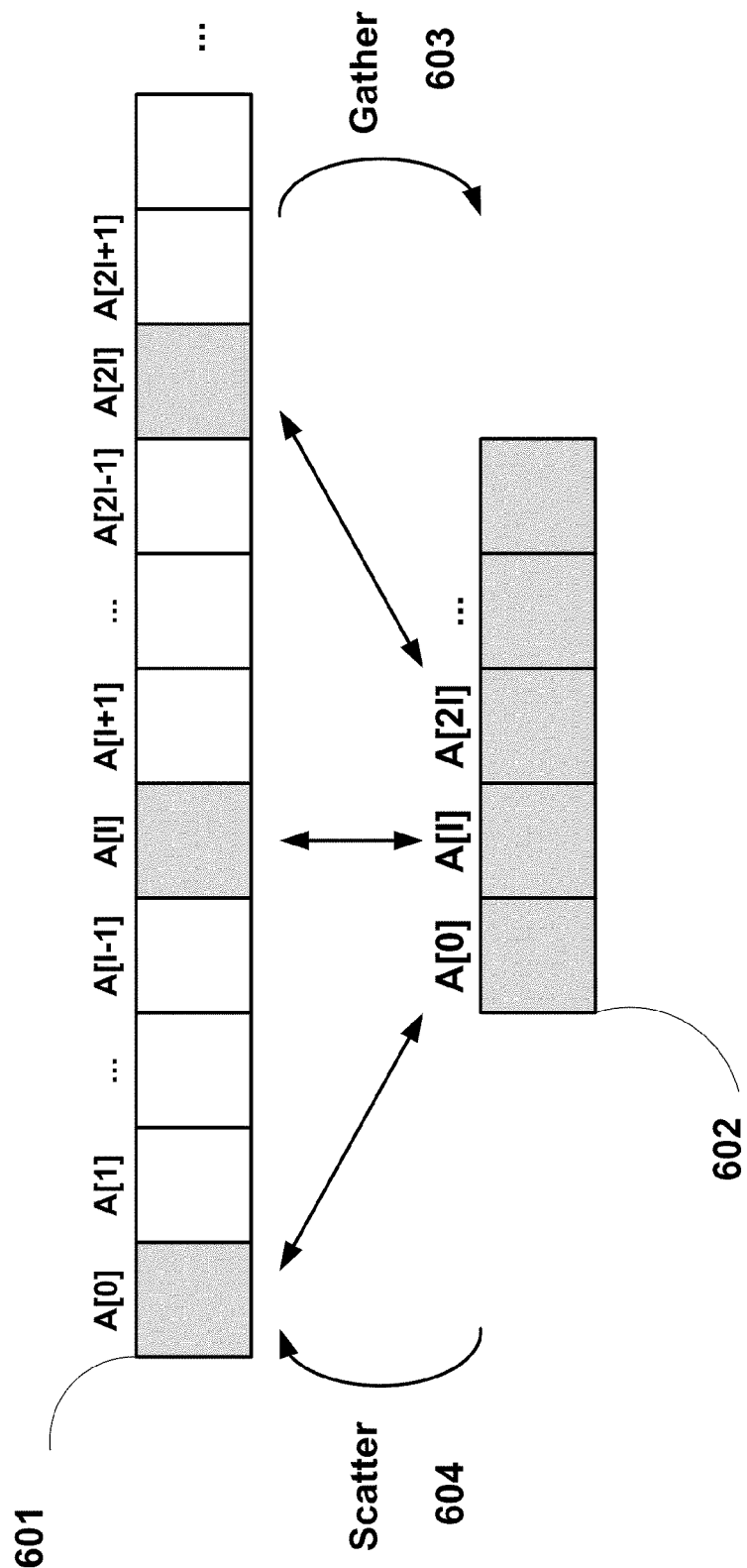
FIG. 6 schematically illustrates how a strided access can be converted to a contiguous access using the gather-scatter technique.

After the storage unsharing transformation, many holes (unused addresses) can be created in the separate memories. The seventh optimization improves the hit rates of caches connected to these memories by reorganizing the memory data layout to remove these holes, for example by using a gather-scatter [11] technique. If a strided memory access pattern with a stride larger than one is discovered, then this strided pattern can be converted into a unit stride pattern by gathering the accessed data elements. FIG. 6 shows an array A (601) accessed with stride-I. The locations in the parent memory that are I elements apart (i.e., addresses 0, I, 2I, . . . , that are shown in grey) are gathered (603) to obtain contiguous access in the child memory (602). At the exits of the scope of the child memory, the child memory must be scattered back (604) before flushing its contents to the parent memory. The reorganized compact memory space will be accessed with addresses 0, 1, 2, . . . rather than array_base+n*I, n=0, 1, 2, . . . as in the original memory with holes in it. Notice that the original software program's memory layout will be retained when the present cache is flushed to the next cache level with a scatter operation. We have the following relationships to convert between the compacted array (child memory) addresses and the original parent memory addresses during linking and unlinking of a compacted array child memory:

```
compacted_array_address
=f(original_address)
=(original address−array_base)/I
original_address
=f⁻¹(compacted_array_address)
=compacted_array_address*I+array_base
```

A similar example of removing holes emanates from an array of C/C++ objects/structures. Given a complex number array

```
struct Complex {
    float real;
    float imag;
} c[N];
``` references to c[i].real and c[i].imag will likely be placed in different memories containing only the imaginary or only the real parts of the c array. This separation will allow accessing the fields of the structure in parallel using only single-ported memory structures. There of course will be many holes in each of these two memories.

Assuming there is sufficient reuse, we would like to create compact memories with the holes removed. In the original layout a field such as c[i].imag is addressed by array_base+object_size*i+field offset, (c+8*i+4), i=0,I, . . . , N−1. A compacted version of the same memory, laid out as if it were like a dedicated SRAM can simply be addressed with field_size*i, i=0, 1, 2, . . . , N−1. Note that as the dirty entries in the compact array are flushed to the parent, the original addresses must be used to send flush requests to the parent cache. The original address and the compact array address have the following relationships, which can be used within address conversions during linking and unlinking:

```
compacted_array_address
=f(original_address)
=(original_address − array_base) /
object_size * field_size
original_address
=f⁻¹(compacted_array_address)
=compacted_array_address  / field_size *
object_size + field_offset + array_base
```

Generalizing the above transformation: To implement a compacted address space in a child memory, we merely need a function $f$ of the original address to obtain an address into the child memory, and its inverse function $f^{-1}$ to convert a compacted child memory address back to the original parent memory address. Such a child memory must comply with the following rules:

A memory instruction using parent memory address x, must access location $f(x)$ within the compacted child memory address space.
   During linking, a child memory address $f(x)$ must be initialized from address x in its parent memory.
   During unlinking, each dirty child memory address y must be flushed to address $f^{-1}(y)$ in its parent memory.
   $f$ and $f^{-1}$ do not need to be simple linear functions. Any function and its inverse can be used for creating a compact child memory address space from a sparse parent memory address space, depending on the available hardware resources dedicated to the function. The nonzero elements of a sparse matrix row can be compacted into a linear array during linking, operated on, and scattered back to their sparse matrix locations during unlinking, using an auxiliary array of indices of the nonzero elements. When the reuse rate of a data structure justifies data layout change, for example: A matrix can be transformed during linking, operated on and then transformed back to the original layout during unlinking. A diagonal of a matrix can become a linear compacted array, a linked list can be turned into a linear array, and so on.

Normal compiler optimizations can be performed on such address calculations involving $f$ and $f^{-1}$. For example: strength reduction, and code motion out of loops.

8—Code Duplication Techniques to Increase Number of Independent Memories

As the eighth optimization, in order, to increase the effectiveness of storage unsharing, code duplication techniques (e.g., loop transformations such as loop splitting, loop unrolling) can be applied to increase the number of disjoint memory address spaces. For instance, the following program fragment contains a memory instruction $I_1$ in a loop:

```
            for i = 0 to N−1
    I₁:        store MEM_A [ A[i] ] = i
            end
```

Assume that this memory instruction is independent of the other memory instructions in the program, and has a dedicated memory $MEM_A$ that can operate independently of the other memories. In this case, a single instance of this memory instruction writes values to the A array, sequentially. Instead, if the iterations of this loop are split into two groups, the following code is obtained:

```
            for i = 0 to (N/2)−1
    I₁:        store MEM_{A1} [ A[i] ] = i
            end
            for j = N/2 to N−1
    I₂:        store MEM_{A2} [ A[j] ] = j
            end
```

In this second version, there are two independent memory instructions $I_1$ and $I_2$. Therefore, these instructions have their own memories ($MEM_{A1}$, $MEM_{A2}$) that can operate independently in parallel. As shown by this example, applying loop splitting can increase the number of independent memories extracted using storage unsharing.

Another loop transformation that can increase the number independent memories of obtained from storage unsharing is loop unrolling. As an example, consider the following program code with two loops both of which execute 3 iterations:

```
            for i = 0 to 2
                for j = 0 to 2
    I₁:            store MEM_A [ A[i,j] ] = i+j
                end
            end
```

If the outer loop is completely unrolled, three j-loops (i.e., $j_1$, $j_2$, and $j_3$), each accessing a different part of the A matrix are obtained:

```
            for j₁ = 0 to 2
    I₁:        store MEM_{A1} [ A[0,j₁] ] = j₁
            end
            for j₂ = 0 to 2
    I₂:        store MEM_{A2} [ A[1,j₂] ] = 1+j₂
            end
            for j₃ = 0 to 2
```

-continued $I_3$:     store $MEM_{43}$ [ A[2,$j_3$] ] = 2+$j_3$
        end

The $I_1$, $I_2$, and $I_3$ instructions are independent and storage unsharing dedicates distinct memories for them. In this example, complete unrolling of both the outer loop and the inner loop results in an ultimate address separation, where 9 accesses to the A matrix are all separated to distinct memories. Since each of these memories contain only a single element, they can easily be promoted to registers to obtain 9 completely independent registers, each accessed by a single instruction. It should be noted that all memories extracted by this invention are addressed using exactly the same addresses as the software counterpart of the whole program.

9—Separating Memories of Stores that Write the Same Value (Silent Stores)

We said that two memory instructions are dependent and must be placed in the same memory within a region, if one of the operations is a store and the instructions may refer to the same address. This restriction can be relaxed in number of ways, the first of which described here, within the ninth optimization.

Given two store instructions $I_1$ and $I_2$, where the value stored by $I_1$ is proved to be always the same as the value stored by $I_2$, $I_1$ and $I_2$ are not dependent and can be executed in any order, since the final result in memory will be same regardless of the order of execution of $I_1$ and $I_2$. It was determined that stores that write the same value do occur frequently in software programs, in the silent stores study [15].

Thus, given two stores that store the same value within the region of interest, delete the dependence edge between them, if any. Then proceed with finding connected components and memory separation as usual. When a memory contains only one such store operation, the separation benefit of this dependence relaxation can be clearly seen, as in this example:

```
int A[N]; //MEM1, initial val=1
int v[N]; //MEM2
for i = 0 to N−1
   link MEM3=MEM1;
   link MEM4=MEM1
   //t1 constant within i loop
   load t1=MEM2[v[i]];
   for j1=0 to N−1
      if (cc1)
I1:      store MEM3[A[rand( )%N]]=t1;
      end
      for j2 = 0 to N−1
         if(cc2)
I2:      store MEM4[ A[j2]]=t1;
      end
   unlink MEM1=MEM3
   unlink MEM1=MEM4
end
I3:load t2=MEM1[ A[m] ];
```

Here when entering the i loop iteration body, the MEM3 and MEM4 cache is initialized to all invalid entries. The j1 loop and j2 loop can proceed in parallel on the independent memories MEM3 and MEM4, respectively, even though they may be storing to overlapping addresses.

As the iteration i ends, the dirty blocks in the MEM3 and MEM4 caches are flushed to the MEM1 cache and invalidated. The correctness of the result will not be affected by the parallel execution of these stores in any order, since they store the same value.

10—Separating Memories of Commutative and Associative Memory Update Instructions.

The tenth optimization implements an additional dependence relaxation. We can use the following technique for separating memories of commutative and associative[2] memory update operations.

[2] For a commutative operation op, for all x and y, x op y=y op x. For an associative operation op, for all x,y,z,(x op y) op z=x op (y op z). For example, maximum, minimum, addition, xor, and, or are all both commutative and associative.

Assume we are given two update (read-modify-write) memory operations $I_1$ and $I_2$ using the same commutative-associative operation of the form:

MEM[addr]=MEM[addr]+val, where the + sign can stand for any commutative-associative operation such as add, xor, and, or, min, max, . . . or a user-defined custom hardware operation. The two update operations must also use the same operand size (i.e. both must be aligned N byte updates, where N is a power of 2).

If there is a dependence edge between $I_1$ and $I_2$ (i.e., the addresses of $I_1$ and $I_2$ may overlap), that edge is deleted from the dependence graph. After deleting such edges, connected component formation and memory separation proceeds as usual.

The justification for deleting the dependence edge is that commutative-associative update operations $I_1$ and $I_2$ can be executed in any order without impacting the final result (execution must be in the form of an atomic update, meaning: no other memory operation to the same address should intervene between the read, modify and write operations constituting the update).

If, as a result of storage unsharing, a child memory is connected to only one update operation, then on any program execution trace containing an instance of this update operation $I_1$ referring to an address, for example m, the other instructions referring to the same address m on the same execution trace within this region must only be update instructions using the same opcode and operand size (here is why: if there was a plain load or store $I_2$ referring to m in the same execution trace where $I_1$ referred to m, it would also be connected to the same memory as $I_1$ since $I_1$ and $I_2$ are dependent. But we assumed the cache was connected to the one update instruction $I_1$ only, so this cannot be right.). However, using a normal child cache will not give the correct result for parallel update operations being executed in different independent child caches. We must create a special updating cache to implement this memory connected to a single update instruction, as follows:

When a cache block in an updating cache is accessed:
   If there is a miss on an update, a new block containing all zeros is allocated within the cache; (the block is never read from the next cache level.). Here "zero" means the proper zero corresponding to the commutative-associative operation (for example, zero is minus infinity for the max operation).
   Then, the addressed word in the block is updated and the word is marked as dirty.
If, as a result of creating a new cache block, an old cache block needs to be replaced, or during the final unlink operation a block is being flushed, the old block (including its dirty word mask) is sent to the parent cache with a special updating flush command.
Upon receiving an updating flush from a child cache, for each dirty word in the child cache block, the old contents of the word in the parent cache line is added (or operated on with any commutative-associative operation) to the corresponding word in the child cache block, and stored back into the same word of the parent cache block, as atomic operations.

The following example illustrates the operation of an updating cache and updating flushes to its parent cache:

```
link MEM1=MEM //A
int A[N]; //MEM1, initialized to 1
begin //region contains updates only
    link MEM2=NULL;//initialize to 0
    link MEM3=NULL//initialize to 0
    for j1=0 to 10*N-1
        if(cc1)
I₁:        update MEM2[A[rand1( )%N]]
            += rand1( );
        end
    for j2 = 0 to 10*N-1
        if(cc2)
I₂:        update MEM3[A[rand2( )%N]]
            += rand2( );
        end
    unlink MEM1=MEM2//updating flush
    unlink MEM1=MEM3//updating flush
    end
I₃:load t=MEM1[A[m]];
    unlink MEM=MEM1
``` where + is any of the associative-commutative operations. link operations to NULL, initialize the updating memories to zero (of the particular commutative-associative operation), unlike the normal link to NULL semantics, which initializes a memory to undefined values.

The recursive storage unsharing analysis for updating child memories has a slightly different logic. The regions include not only loops but also begin-end blocks. During the recursive storage unsharing analysis, given that the current parent loop/region has a memory containing updates as well as normal loads/stores, but the current child region (possibly a begin-end block), contains only updates within this memory, then, new updating child memories are created within the child region for each such update instruction. As usual, the child region must be bracketed by link and unlink operations for initializing and flushing the child memories activated within this region.

Notice that the instances of the updates $I_1$ and $I_2$ can be executed in any order without impacting the final values in the parent MEM1 memory, and are not dependent on each other. The j1 and j2 loops can run in parallel even if their update addresses may overlap. During the begin block, $I_1$ and $I_2$ are connected to updating caches. Here is an example trace of events on a particular index m of array A:

initially in the parent memory MEM1: A[m]==1

The begin block starts, with child memories MEM2 and MEM3 initialized to 0s. (their updating caches are initialized to all invalid entries).

update +=2 executed on word m of child cache MEM2. Since there will be a miss, the new line containing A[m] is initialized to zero (it is not read from MEM1), and then A[m] becomes 2 in child memory MEM2.

update +=3 executed on child memory MEM3, A[m] is initialized to zero on a block miss, and then becomes 3 in MEM3.

update +=1 executed on child memory MEM3, A[m] becomes 4 in MEM3

At the end of the begin block, child memory MEM2 is flushed to parent MEM1 with an updating flush, and is invalidated. Within MEM1, A[m] was initially 1. A[m] in the parent cache MEM1 now becomes 1+2=3 child memory MEM3 is flushed to parent MEM1 with an updating flush. In the parent memory MEM1, A[m] now becomes: 3+4=7.

This is the correct result in the parent memory, equivalent to starting with an initial value of A[m]==1 and executing the updates +2,+3,+1 sequentially on A[m] in any order, yielding 7 as the final answer. However, in the present case the updates could be done in parallel. Notice that the same approach could be used with any other commutative-associative update operation.

11—Deferring Storage Unsharing Decisions Until Runtime

We will now describe the eleventh optimization. The storage unsharing method is based on static dependence analysis that is used to extract the groups of dependent memory instructions. In some cases, either the static information is not sufficient or the dependence analyzer is not strong enough to decide whether a dependence condition can be satisfied, resulting in a maybe dependence answer. In this case, a conservative approach is taken and the memory instructions are assumed to be dependent. As a result, larger connected components of the dependence graph are obtained. An alternative approach is to postpone the evaluation of the dependence condition until runtime. Additional information that becomes available at runtime can be used to evaluate the dependence condition and decide whether a dependence actually exists. By delaying the detection of dependences between two memory instructions until run time, one can achieve further optimizations in the extracted memory hierarchies.

One example of the use of run-time information is profiler-feedback based determination of dependences. A pair of memory instructions $(I_1,I_2)$ may be thought to be potentially dependent by compiler dependence analysis (giving a maybe answer, meaning the compiler is not sure). But in the actual execution traces of the program on the inputs that matter, $I_1$ and $I_2$ may not depend on each other. With static compiler analysis alone, $I_1$ and $I_2$ will be placed in the same memory due to this unnecessary conservative approach.

To implement profiling feedback for storage unsharing, the original program's assembly code is modified by adding a call to a profiling subroutine at each load instruction, store instruction, loop entry control flow graph edge or loop exit control flow graph edge. Then the instrumented code is run on representative inputs, to determine an actual dependence graph for each program region. While this requires substantial overhead, long running programs still can be profiled through sampling, i.e. by executing the profiling version of the code only periodically for collecting random samples, and by remaining in the original code most of the time. The profiler may switch back and forth between the profiling code and the ordinary code at periodic polling points.

For each loop, the profiler will give us a set of unordered dependence edges $(I_1,I_2)$, if at least one of $I_1$ and $I_2$ is a store, and during any fixed iteration of this loop and within any iterations of the inner loops within this fixed loop iteration, $I_1$ and $I_2$ referred to the same location. I.e., the profiler will be detecting a dependence based on the verbatim definition of dependence within a region.

For a given region, we will have two dependence graphs: one generated by static conservative compiler analysis and another generated by profiling feedback. The profiler dependence graph edges will be a subset of the static dependence graph edges. Therefore, given a static-analysis based connected component y, there will be a corresponding set of profiler-based connected components $x_1, x_2, \ldots x_n$ (n>0) which constitute a partition of y. E.g., given a static compiler generated memory y containing $\{I_1,I_2,I_3\}$ the corresponding profiler feedback generated memories may be $x_1=\{I_1,I_2\}$ $x_2=\{I_3\}$, because the profiler never saw $I_3$ overlap with $I_1$ or $I_2$ on the inputs tested. $\{\{I_1,I_2\},\{I_3\}\}$ is a partition of $\{I_1,I_2,I_3\}$. But the compiler cannot prove that for all inputs, $I_3$ will never overlap with $I_1$ or $I_2$. This overlap must therefore be checked at run time, as follows:

First create the recursive memory hierarchy as usual, using the speculative, profiler feedback based dependence information.

For each static analysis based connected component y in a loop region do:

If this component y corresponds to a partition of more than one profiler based connected component, say $x_1$, $x_2$, and $x_3$, create a special overlap detection memory for $x_1$, $x_2$, and $x_3$. This memory has a read bit and write bit for each data item of $x_1$, $x_2$, and $x_3$. A special DRAM area in the accelerator is reserved to serve as the root memory level for overlap detection bits.

The overlap detection memory should have sufficient bandwidth, e.g., through bank interleaving, and should be highly pipelined in order not to slow down the main accelerator. But its latency for detecting an error is not critical. Only the unlink operations to the root memory must wait until all error-checking activities within the overlap detection units are complete.

At run time, when an iteration is entered, set all overlap detection memory read and write bits to zero for this region.

When there is a write to any speculatively separated memory $x_i$ word m, set the $x_i$ write bit for word m of the corresponding overlap detection memory. Also set the word m write bit also for any ancestor memories of $x_i$ that are speculatively separated within their own region. All these ancestor memories must presently be active.

When there is a read to a speculatively separated memory $x_i$, and the read is committed (no longer speculative[3]), set the $x_i$-read bit of word m in the corresponding overlap detection memory. For any ancestor memories of $x_i$ that are speculatively separated in their region, also set the word m read bit of that ancestor memory within its region. These ancestor memories must be presently active.

[3]When there are speculative loads in the program, a non-pointer data item might be assumed to be a pointer and accessed. Therefore waiting for a load to be committed non-speculatively is necessary for correct detection of memory overlap.

If for any pair of speculatively separated group of memories $x_i$ and $x_j$ in the same region, word m of $x_i$ was accessed, and the same word m of $x_j$ was accessed, and at least one the accesses was a write, the accelerator stops after a pipeline delay has elapsed, and the software is notified with an error message indicating the reason for the overlap error (overlap between memories i and j).

Assuming that for a particular word m, $r_i$ means memory $x_i$ word m is (non-speculatively) read, and $w_i$ means memory $x_i$ word m is written, the error detection logic for three speculatively separated memories $x_1$, $x_2$, and $x_3$ then is:

$(r_1 \& w_2) | (w_1 \& r_2) | (w_1 \& w_2) |$
$(r_1 \& w_3) | (w_1 \& r_3) | (w_1 \& w_3) |$
$(r_2 \& w_3) | (w_2 \& r_3) | (w_2 \& w_3)$

When an error message is received, the software application should discard all current accelerator results, and continue execution without using the accelerator (notice that the accelerator and software fragment it replaced must be functionally 100% compatible, so the system will continue to work, only slower). For FPGA hardware, during a subsequent re-compilation of the hardware, memories $x_i$ and $x_j$ can be merged; thus the same speculative overlap error does not occur again.

12—Avoiding Flushing and Reloading a Child Memory, when it is Re-Used Across Multiple Iterations of a Loop To see why the present twelfth optimization to avoid unnecessary unlink and link operations is needed, we can examine the following example. Assume two different rows of a matrix are allocated in different memories during each iteration of an outer loop. However, a row written in iteration i is read in iteration i+1.

```
for i = 1 to N-1
    link MEM_A1 = MEM_A
    link MEM_A2 = NULL //write only
    for j= 0 to N-1
        load t1= MEM_A1[A[i-1,f(j)]]
        add t2=t1+1
        store MEM_A2 [ A[i,j] ] =t2
    end
    unlink NULL = MEM_A1 //read only
    unlink MEM_A = MEM_A2
end
```

In this case it is better to pass the memory containing row i to the iteration i+1, without flushing and reloading any data. Notice that the above code is equivalent to peeling the link instructions from the beginning of the first iteration and re-inserting them at the end of the loop body, as shown below:

```
link MEM_A1 = MEM_A
link MEM_A2 = NULL
for i = 1 to N-1
    for j= 0 to N-1
        load t1= MEM_A1[A[i-1,f(j)]]
        add t2=t1+1
        store MEM_A2 [ A[i,j] ] =t2
    end
    unlink NULL = MEM_A1
    unlink MEM_A = MEM_A2
    if(i!=N-1) then
        link MEM_A1 = MEM_A
        link MEM_A2 = NULL
    endif
end
```

When the data to be read by a child memory MEMc1 (of a parent MEMp) is included in the data already written into another child memory MEMc2 (of the same parent MEMp), the sequence of instructions unlink MEMp=MEMc1
link MEMc2=MEMp can be optimized as a new store and rename instruction (semantically equivalent to the unlink-link sequence above):

store_and rename MEMp,MEMc2=MEMc1 which is a hint to the compiler/hardware to do the following where possible:

1. store into MEMp (the parent of MEMc1) the dirty bytes in the cache of MEMc1 and make these dirty bytes clean; do not invalidate these blocks.
2. start using the same cache for MEMc2

At this point the lifetime of MEMc1 has ended. MEMc1 will get a new all-invalid cache if linked again to MEMp.

This optimization should remove the overhead of storing the cache blocks and reloading them again. Here is the result:

```
        link MEM_{A1} =MEM_A
        link MEM_{A2} =NULL
        for i = 1 to N-1
            for j= 0 to N-1
                load t1= MEM_{A1}[A[i-1,f(j)]]
                add t2=t1+1
                store MEM_{A2} [ A[i,j] ] =t2
            end
            unlink NULL =MEM_{A1}
            if(i!=N-1) then
                store_and_rename
                    MEM_A ,MEM_{A1} =MEM_{A2}
                link MEM_{A2} =NULL
            else
                unlink MEM_A =MEM_{A2}
            endif
        end
```

If iteration i stores into a child memory that will be read by iteration i+k, for a small positive constant k, unrolling the i loop k times before making the above transformation should suffice.

13—Resource-Constrained Memory Separation

The thirteenth optimization is related to handling resource constraints. When constructing an on-chip accelerator where there are only a few hardware resources available, it is necessary to make a trade-off and to create only some dedicated on-chip memories, while letting the other memories reside in off-chip second level storage. Benefits and costs differ for child memory creation decisions. Benefits of creating a child memory include: reduced latency, increased bandwidth, reduced power, increased parallelism, decreased complexity due to smaller coherence hardware. Costs include: link/unlink overhead, increased area, increased complexity due to the introduction of a new hardware component. The difference between benefits and costs become more accentuated when the average re-use rate of the data items in the child memory is high. When the data items in a child memory are referenced only a few times, or if the child memory will not bring about a power reduction, access time, complexity reduction or parallelism advantage, it may not be worthwhile to create that child memory. Notice that it is never wrong not to create a child memory (connected component) from its parent component: As long the threads accessing two originally different memories respect sequential program dependences independently of memory separation, the effect of merging the two memories (whose addresses must already be compatible) into one memory is only a reduced number of ports or an increased amount of coherence hardware, not incorrect behavior.

One strategy (adopted in the present preferred embodiment) is to use the on-chip RAM resources where memory separation will bring about the most benefit, until the resource budget is exhausted, although other resource-constrained optimization techniques can also be used. Based on these observations, a resource-constrained storage unsharing algorithm is described below:

First do maximal recursive storage unsharing without resource constraints and create the memory hierarchy tree as in the first optimization. Estimate resource utilization and compute the memory separation overall evaluation for each child memory node, based on benefits, costs and re-use rate.

The following algorithm marks the child memories that will be kept. Unmarked child memories are subsequently deleted. First mark the root memory node, which cannot be deleted. Then, while the resource budget is not exceeded, mark a node that has not yet been marked and has the highest heuristic evaluation. Finally, following the original memory hierarchy tree in post order (going from the leaves toward the root), delete each unmarked node in the tree, by linking all the children of a deleted node to the parent of the deleted node. More precisely, by using the following algorithm:

```
foreach node n in post order
    traversal of the memory hierarchy
    (from leaves toward root) {
        if marked(n) continue;
        p=current_parent(n);
        for each current child k of n {
            replace the edge (k,n) by (k,p)
        }
        delete the edge (n,p)
        delete n
}
```

Assume that in the example given as part of the first optimization, only the MEM_A1 and MEM_B1 nodes were left undeleted due to finite resource constraints. Here is the resulting code from the algorithm: A number of link/unlink operations have been removed and the number of child memories has been reduced, at the expense of potentially reduced parallelism.

```
//First optimization example
//with resource constraints
    int A[N,N]; //MEM
    int B[N,N]; //MEM
    int C[N]; //MEM
    for i = 0 to N-1
        link MEM_B1=MEM;//B[i,*]
        link MEM_A1=MEM;//A[i,*]
        for j1=0 to N-1
I_0:        load t1=MEM_B1[B[i,j1]];
I_1:        load t2=MEM[C[rand( )%N];
            add  t3=t1+t2;
I_2:        store MEM_A1[A[i,j1] ]=t3;
        end
        for j2 = 0 to N-1
            if(i>=40)
I_3:            load t4=MEM[A[i-40,j2]];
        end
        unlink MEM=MEM_A1;
        unlink MEM=MEM_B1;
    end
I_4: store MEM[A[m,m] ]=0;
```

Regarding resource savings, let us make one additional point. Whenever it is known at compile time that two separate memories will never be accessed at the same time (for example, threads that must wait on each other will not execute at the same time), the physical cache resources among the two memories can also be shared for reducing resource requirements. It is safe to reuse the same physical cache for another arbitrary memory once the existing dirty blocks in the cache have been flushed and invalidated.

EXAMPLE

As a comprehensive example to illustrate the operation of the invention, consider the following program fragment that corresponds to a matrix multiply-add operation C=C+A*B. The three N×N matrices A,B,C in this code are assumed to be laid out in Fortran style column-major order. We will first perform maximal storage unsharing.

```
//Original code:
for(i=0 to N-1)
    for(j=0 to N-1)
        load r3 = MEM[ C[i,j] ]
        for(k=0 to N-1)
            load r1 = MEM[ A[i,k] ]
            load r2 = MEM[ B[k,j] ]
            mul r4 = r1 * r2
            add r3 = r3 + r4
        end
        store MEM[ C[i,j] ] = r3
    end
end
```

Figure 7:
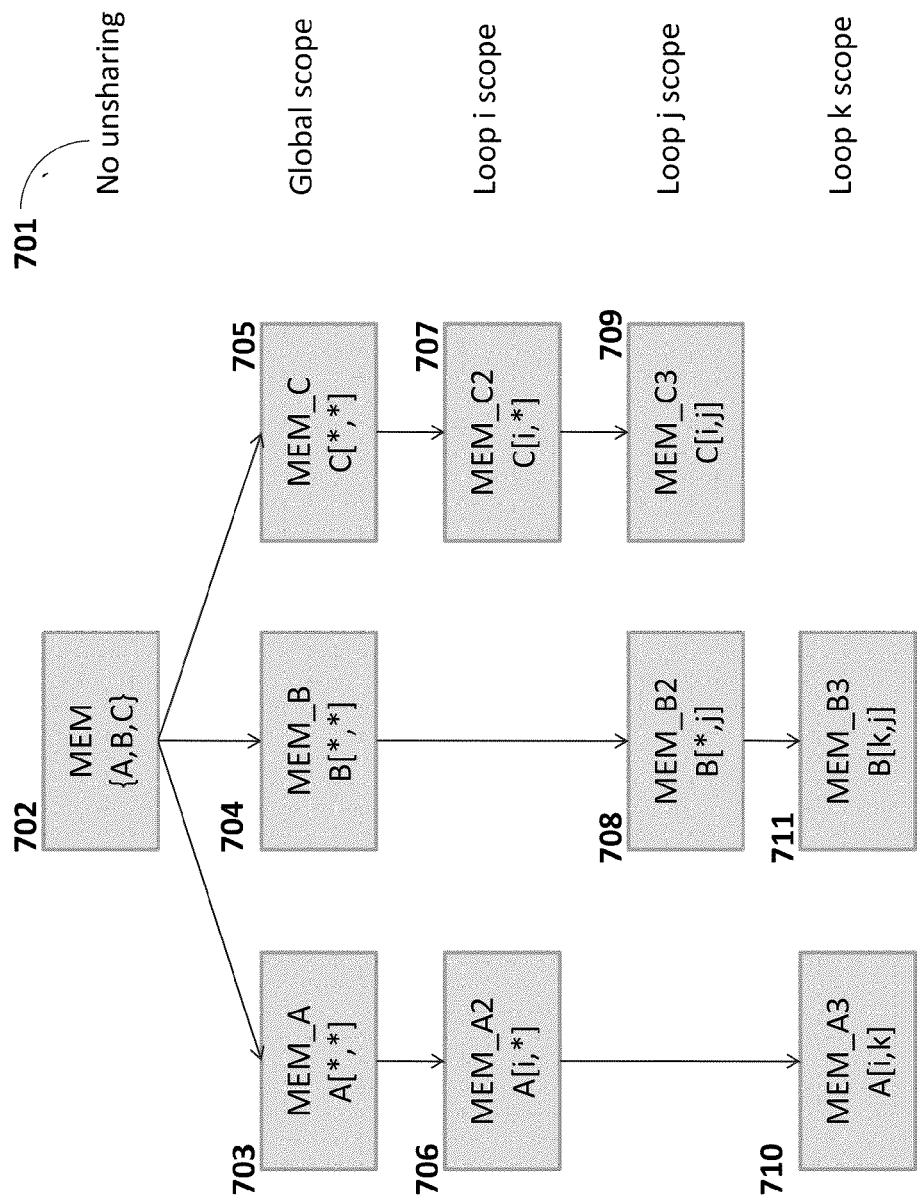
FIG. 7 schematically illustrates the memory partitioning hierarchy that is extracted from a matrix multiply-add algorithm using the invention.

FIG. 7 shows the memory hierarchy of matrix multiply-add as a result of recursive storage unsharing applied at different scopes (701). Before applying storage unsharing, all memory instructions access a single memory that contains all three of the A, B, and C matrices (702). After applying storage unsharing at the procedure scope, accesses to the three matrices are detected to be independent and they are separated, in order to use their own memories (703,704,705). Adding the link and unlink instructions as the last phase of the first application of storage unsharing gives the following code:

```
//storage unsharing of procedure
link MEM_A = MEM
link MEM_B = MEM
link MEM_C = MEM
for(i=0 to N-1)
    for(j=0 to N-1)
        load r3 = MEM_C[ C[i,j] ]
        for(k=0 to N-1)
            load r1 = MEM_A[ A[i,k] ]
            load r2 = MEM_B[ B[k,j] ]
            mul r4 = r1 * r2
            add r3 = r3 + r4
        end
        store MEM_C[ C[i,j] ] = r3
    end
end
unlink NULL = MEM_A
unlink NULL = MEM_B
unlink MEM = MEM_C
```

In this code, the memory instructions that used to access the single, unified memory are modified to access one of the three independent memories dedicated to the A, B, and C matrices. These memories are must be initialized with the contents of the root memory (MEM). However, since the A and B matrices are read-only, they need not be written back. Therefore, they are unlinked to the NULL memory. The C matrix, on the other hand, is modified and its contents must be written back to its parent memory.

A second application of storage unsharing, which is defined over the body of the i-loop, discovers that, each iteration of the i-loop accesses a single row of the A matrix. Therefore, throughout an iteration of the i-loop, the active row of the A matrix can be treated independently and linked to its own memory (706). Although the original memory for the A matrix (MEM_A) stores its columns at stride N, if scatter-gather techniques are applied, these accesses become contiguous. As a result, a cache-based implementation for this memory has a higher hit rate due to increased spatial locality. This memory can also be implemented as a fast tagless memory if N is a compile time constant.

Each iteration of the i-loop also reads and writes a single row of the C matrix. Therefore, throughout an iteration of the i-loop, the active row of the C matrix can also be treated independently and assigned to its own memory (707). The same implementation observations that were made for the active row of A are applicable to the active row of C.

Notice that the load from B[k,j] within the k loop is unaffected by i. Thus the MEM_B memory (704) remains unaffected by the i loop.

```
//storage unsharing of i loop
link MEM_A = MEM //A[*,*]
link MEM_B = MEM //B[*.*]
link MEM_C = MEM //C[*.*]
for(i=0 to N-1)
    link MEM_A2 = MEM_A //A[i,*]
    link MEM_C2 = MEM_C //C[i,*]
    for(j=0 to N-1)
        load r3 = MEM_C2[ C[i,j] ]
        for(k=0 to N-1)
            load r1 = MEM_A2[ A[i,k] ]
            load r2 = MEM_B[ B[k,j] ']
            mul r4 = r1 * r2
            add r3 = r3 + r4
        end
        store MEM_C2[ C[i,j] ] = r3
    end
    unlink NULL = MEM_A2
    unlink MEM_C=MEM_C2
end
unlink NULL = MEM_A
unlink NULL = MEM_B
unlink MEM = MEM_C
```

Furthermore, a third application of storage unsharing over the body of the j-loop uncovers two more important optimizations. First, each column (column j) of the B matrix, second, the [i,j]$^{th}$ element of the C matrix can be linked to their own memories (708 and 709).

One column of the B matrix can be promoted to a faster memory type. However, in order to be able to implement it using a tagless memory structure, its size (i.e., the value of N) must be known at compile time:

The loads from A[i,k] inside the k loop are independent of the value of j and thus the MEM_A2 memory (706) remains unaffected by loop j.

```
//storage unsharing of j loop
link MEM_A = MEM //A[*,*]
link MEM_B = MEM //B[*.*]
link MEM_C = MEM //C[*.*]
for(i=0 to N-1)
    link MEM_A2 = MEM_A //A[i,*]
    link MEM_C2 = MEM_C //C[i,*]
    for(j=0 to N-1)
        link MEM_B2=MEM_B//B[*,j]
        link MEM_C3=MEM_C2/C[i,j]
        load r3 = MEM_C3[ C[i,j] ]
        for(k=0 to N-1)
            load r1 = MEM_A2[ A[i,k] ]
            load r2 = MEM_B2[ B[k,j] ]
            mul r4 = r1 * r2
            add r3 = r3 + r4
        end
        store MEM_C3[ C[i,j] ] = r3
        unlink NULL=MEM_B2
        unlink MEM_C2 = MEM_C3
    end
    unlink NULL = MEM_A2
    unlink MEM_C=MEM_C2
end
unlink NULL = MEM_A
unlink NULL = MEM_B
unlink MEM = MEM_C
```

Note that the MEM_C3 address space has only one element in it during its lifetime, namely C[i,j]. Such single datum address spaces can be used for register promotion.

A fourth application of storage unsharing in the k loop discovers that the A[i,k] (710) and B[k,j] (711) become single datum child memories within the k loop. The final code obtained from recursive storage unsharing is as follows:

```
//storage unsharing of k loop
link MEM_A = MEM //A[*,*]
link MEM_B = MEM //B[*,*]
link MEM_C = MEM //C[*,*]
for(i=0 to N-1)
   link MEM_A2 = MEM_A //A[i,*]
   link MEM_C2 = MEM_C //C[i,*]
   for(j=0 to N-1)
      link MEM_B2=MEM_B//B[*,j]
      link MEM_C3=MEM_C2//C[i,j]
      load r3 = MEM_C3[ C[i,j] ]
      for(k=0 to N-1)
         link MEM_A3=MEM_A2//A[i,k]
         link MEM_B3=MEM_B2//B[k,j]
         load r1 = MEM_A3[ A[i,k] ]
         load r2 = MEM_B3[ B[k,j] ]
         mul r4 = r1 * r2
         add r3 = r3 + r4
         unlink NULL=MEM_A3
         unlink NULL=MEM_B3
      end
      store MEM_C3[ C[i,j] ] = r3
      unlink NULL=MEM_B2
      unlink MEM_C2=MEM_C3
   end
   unlink NULL = MEM_A2
   unlink MEM_C=MEM_C2
end
unlink NULL = MEM_A
unlink NULL = MEM_B
unlink MEM = MEM_C
```

Maximal storage unsharing gives a clear view about how memory can be hierarchically partitioned, however we do not have to implement the maximal storage unsharing result verbatim. Starting from the maximal storage unsharing result, decisions can be made to keep only some of the child memories based on a cost-benefit analysis described in optimization thirteen (For example, MEM_A2 is a particulatly profitable child memory since it avoids the non-unit stride access and is reused many times). Also, since the storage unsharing result shows that A[i,*] C[i,*] and B[*,j] are accessed as indivisible blocks of memory and since the operations on these blocks (such as the cross-product pattern in the k loop) are vectorizable or can be otherwise implemented in parallel is known ways, these blocks can be vector register promoted to N element vector registers, as described in the end of the fifth optimization:

```
//transformed version of matrix
//multiply-add
//program using vector registers
for(i=0 to N-1)
   vAi=A[i,*]://MEM_A
   vCi=C[i,*]://MEM_C
   for(j=0 to N-1)
      vBj=B[*,j]//MEM_B
      vCi[j]+=
         crossProduct(vAI,vBj)
   end
   C[i,*]=vCi
end
```

Notice that a promoted register is loaded/stored in the parent of the child memory it replaced. So to achieve the vector register promotion along with some memory parallelism, it suffices to keep only the hierarchy nodes: MEM, MEM_A, MEM_B, MEM_C.

APPENDIX A

Recursive Storage Unsharing Algorithm

Continuing from the first optimization, here are further details of the recursive storage unsharing algorithm, presented in pseudo C++ code:

```
void recursive_unsharing(
  //OUTPUTS:
  //(child loop,child memory)->
  //(parent loop, parent memory) edges
  set<
    pair<
      pair<Loop,Memid>,
      pair<Loop,Memid> > >&
  memoryHierarchy
  //memory->ins. in memory and children
  ,vector< pair< Memid, set<Insid> > >&
  mem2ins
  /*:=*/
  //INPUTS:
  ,const
  set< tuple<Loop,Memid, set<Insid> > >&
    parent_nodes //parent memories
  ,const Loop l //current loop
  ) {
  set< tuple<Loop,Memid,set<Insid> > >
    child_nodes; //child memories
  foreach (L,M,V) in parent_nodes {
    set<Insid> V'=
      members of V that are inside loop l
    if(l is not the outermost region and
       addresses of all instructions of V'
       are independent of
       induction variables of l
    ) { //loop l will have no effect
      Add (L,M,V) to child_nodes;
      continue;
    }
    set< pair<Insid,Insid> > E'=empty;
    foreach unordered pair (x1,x2)
      of instructions x1, x2 in V' {
      if x1 and x2 are dependent inside
        a fixed iteration the loop l,
        add (x1,x2) to E';
      }
    }
    set<set<Insid>> cc =
      find_connected_components(V',E');
    foreach child connected component
      v' in cc {
      Memid m=new_memory_id( );
      Add the child-parent edge
        (l,m)->(L,M) to memoryHierarchy,
      Add (m,v') to mem2ins
      Add (l,m,v') to child_nodes
    }
  }//end foreach (L,M,V)
  //recursive_unsharing continued
  foreach inner loop l' of l {
    recursive_unsharing(
      memoryHierarchy
      ,mem2ins
      /*:=*/
      ,child_nodes
      ,l');
  };
}//end recursive unsharing
```

This algorithm is called initially with the inputs:
l=the region containing the entire procedure
parent_nodes=((NIL, MEM, set of all memory instructions in the procedure)).
Where NIL represents an imaginary region that encloses the procedure, and MEM (memory zero) represents the root memory.

The output parameters are initialized to:
memoryHierarchy=empty map
mem2ins={(MEM, set of all memory instructions in the procedure)}

The algorithm returns the memoryHierarchy data structure which is a set of parent links (child loop, child memory)→(parent loop, parent memory) representing the memory hierarchy. There is a parent link (l,m)→(L,M) if and only if memory M was created on entry to an iteration of loop L, and memory m is a child memory of M, and was created on entry to an iteration of loop l. Each memory has one and only one creation loop (MEM has creation loop NIL). Note that the hierarchy can skip intermediate loop levels where a memory is loop invariant: a child memory m of a parent memory M, need not be created in an immediate inner loop of M's creation loop L, as it can be observed in the example in FIG. 7.

The algorithm also returns a mem2ins vector data structure which contains the pairs (memory m, the set of instructions included in the memory m and its children memories).

Using these data structures, the program can be rewritten to use multiple memories as follows:
for each parent edge (l,m)→(L,M) in memoryHierarchy
    At the entry edges of the loop/iteration body in the control flow graph, add
        link $MEM_m = MEM_M$
    At the exit edges of the loop l iteration body in the control flow graph (this includes branches back to the top of the loop) add:
        unlink $MEM_M = MEM_m$
Then, compute the instruction→memory mapping for each memory instruction (if an instruction belongs to both a child memory and its parent memory, the child memory wins, i.e. the instruction is made to use the child memory.). Notice that mem2ins is ordered from the parent memories toward child memories (reverse post order):

```
map<Instr,Memid> ins2mem;
foreach (m,v) in mem2ins {
    foreach( x in v) ins2mem[x]=m
}
```

Then, for each memory instruction x in the program, rewrite it with MEM replaced with $MEM_{ins2mem[x]}$. Here, $MEM_0$ represents MEM, the root memory.

REFERENCES

[1] Barua, Lee, Amarasinghe, Agarwal, 1998. Maps: a Compiler-Managed Memory System for RAW Machines. Technical Report. UMI Order Number: TM-583., Massachusetts Institute of Technology.
[2] Babb, Rinard, Moritz, Lee, Frank, Barua, Amarasinghe, 1999. Parallelizing Applications into Silicon. In Proceedings of the Seventh Annual IEEE Symposium on Field-Programmable Custom Computing Machines (Apr. 21-23, 1999). FCCM. IEEE Computer Society, Washington, D.C., 70.
[3] Coulson et al., March 1985, U.S. Pat. No. 4,503,501
[4] Lau and Malinowski, April 1996, U.S. Pat. No. 5,553,023
[5] Wisler et al., March 2002, U.S. Pat. No. 6,360,303
[6] Megory-Cohen, October 1994, U.S. Pat. No. 5,357,623
[7] Olarig et al., March 2005, U.S. Pat. No. 6,865,647
[8] Blumrich, October 2002, U.S. Pat. No. 6,493,800
[9] Ebcioglu and Silberman, August 1998, U.S. Pat. No. 5,799,179
[10] http://en.wikipedia.org/wiki/Cache coherence
[11] http://en.wikipedia.org/wiki/Gather-scatter (vector addressing)
[12] http://en.wikipedia.org/wiki/Dependence_analysis
[13] http://en.wikipedia.org/wiki/GCD_test
[14] G. A Scalzi, A. G. Ganek, R. J. Schmatz. Enterprise Systems Architecture/370: An architecture for multiple virtual space access and authorization. IBM Systems Journal, Vol. 28. No 1, 1989. pp. 15-38.
[15] Kevin M. Lepak and Mikko H. Lipasti. 2000. Silent stores for free. In Proceedings of the 33rd annual ACM/IEEE international symposium on Microarchitecture (MICRO 33). ACM, New York, N.Y., USA, 22-31. DOI=10.1145/360128.360133 http://doi.acm.org/10.1145/360128.360133
[16] Mark D. Hill and Alan Jay Smith. 1984. Experimental evaluation of on-chip microprocessor cache memories. In Proceedings of the 11th annual international symposium on Computer architecture (ISCA '84). ACM, New York, N.Y., USA, 158-166. DOI=10.1145/800015.808178 http://doi.acm.org/10.1145/800015.808178
[17] Manoj Franklin. The Multiscalar Processor. PhD Thesis, 1993. Computer Sciences Department. University of Wisconsin-Madison. ftp://ftp.cs.wisc.edu/sohi/theses/franklin.pdf

What is claimed is:

1. A method to create a hardware hierarchy of memories from a software program fragment within a software program, the method comprising:
   (a) performing compiler dependence analysis over memory instructions in the software program fragment;
   (b) finding smallest groups of the memory instructions, wherein the smallest groups are not dependent on each other; assigning each such group to a separate new memory, which is accessed using original memory addresses of the software program fragment;
   (c) modifying the memory instructions of each group to make the memory instructions access the separate new memory that the smallest group was assigned to; and
   (d) at run time, initializing each separate new memory from original memory of the software program, at entries of the software program fragment; storing changes made by the software program fragment in each separate new memory back to the original memory of the software program, at exits of the software program fragment;
   (e) creating an application-specific hardware accelerator implementing the software program fragment as modified in steps (a)-(d) in hardware, wherein the application-specific hardware accelerator comprises the separate new memories created in step (b), and communicates with the software program as follows:
       (i) at the beginning of the said program fragment, the software program signals the application-specific hardware accelerator to start;
       (ii) the application-specific hardware accelerator initializes the separate new memories from the original memory of the software program;
       (iii) the application-specific hardware accelerator operates on the separate new memories, performing the computation specified by the software program fragment;
       (iv) the application-specific hardware accelerator stores the changes made by the software program fragment in the separate new memories back to the original memory of the software program, and signals the software program that the application-specific hardware accelerator has completed; and (v) the software program continues execution from the end of the software program fragment.

2. The method in claim 1 further comprising: using caches in place of memories.

3. The method in claim 2 further comprising: valid and dirty bits to eliminate false sharing in cache blocks.

4. The method in claim 2 further comprising: initialization of cache blocks to an all-invalid state in case of a write miss.

5. The method in claim 2 further comprising: using compiler dependence analysis to prove that no false sharing occurs on a cache.

6. The method in claim 2 further comprising: using compiler dependence analysis to detect the largest cache block size that yields no false sharing on a cache.

7. The method in claim 2 further comprising: improving spatial locality in a separate new memory, by using an address transformation function to convert an original program memory address to a corresponding new memory address when reading, writing or initializing the separate new memory; using the inverse of the address transformation function to convert a new memory address to the corresponding original program memory address, when flushing the changes made in the separate new memory.

8. The method of claim 1 wherein a symbolic execution based compiler data flow analysis is used to generate information to be used in compiler dependence analysis.

9. The method of claim 1, wherein recursive application of the method is implemented over various program granularities.

10. The method in claim 1 further comprising: using tagless memory structures.

11. The method in claim 1 further comprising: optimizing the performance of memory initialization and flushing, by flushing the changes made in a new memory to the NULL memory, and initializing a new memory from the NULL memory.

12. The method in claim 1 further comprising: performing code duplication modifications before applying memory separation, to enhance the effectiveness of memory separation.

13. The method in claim 1 further comprising: reducing the number of memory ports of a memory unit by enabling port sharing.

14. The method in claim 1 further comprising: avoiding flushing and initialization overhead of memories during a loop's execution, by re-using data already fetched or stored by an earlier iteration of the loop, in a later iteration of the same loop.

15. The method of claim 1 further comprising: separating memories of store instructions, whenever the store instructions also write the same data.

16. The method of claim 1 further comprising: separating memories of commutative-associative memory update instructions.

17. The method in claim 1 further comprising: delaying storage separation decisions until runtime, based on profiler directed feedback.

18. The method in claim 1 further comprising:
assigning different memories to two groups of memory access instructions based on a speculative assumption that the two groups of instructions will not depend on each other at runtime;
monitoring actual dependences between the speculatively separated groups of instructions at run time;
raising an error and canceling the changes to the software application memory when the speculative assumption is found to be incorrect at runtime; and
correcting the incorrect speculative assumption by merging the offending two groups into one, during a subsequent re-compilation.

19. The method in claim 18, extended to more than two groups of speculatively-separated instructions.

20. The method of claim 18, extended to a recursive hierarchy of speculatively-separated instruction groups/memories.

21. The method of claim 1 further comprising: selectively preventing the compiler decisions to create separate new memories, in order to meet resource constraints.

22. The method of claim 1 further comprising: sharing hardware resources between two memories, when the two memories will not be accessed at the same time.

* * * * *